United States Patent
Squires et al.

(10) Patent No.: US 6,279,108 B1
(45) Date of Patent: Aug. 21, 2001

(54) PROGRAMMABLE MICROCONTROLLER ARCHITECTURE FOR DISK DRIVE SYSTEM

(75) Inventors: John P. Squires, Jamestown; Thomas A. Fiers, Longmont; Louis J. Shrinkle, Boulder, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/062,737

(22) Filed: May 14, 1993

Related U.S. Application Data

(63) Continuation of application No. 07/790,008, filed on Nov. 4, 1991, now abandoned, which is a continuation of application No. 07/488,386, filed on Feb. 23, 1990, now abandoned, which is a continuation of application No. 07/057,806, filed on Jun. 2, 1987, now abandoned.

(51) Int. Cl.$^7$ ............................... G11B 17/22; G06F 9/44
(52) U.S. Cl. ..................... 712/244; 712/227; 711/219; 711/171; 369/32; 710/266
(58) Field of Search .................. 395/800, 200, 395/275, 375, 550, 325, 350, 775, 725, 400, 425, 700, 575, 250; 364/DIG. 1, DIG. 2; 369/59, 32, 62; 712/227, 248, 244, 221, 228; 711/219, 111, 171, 172, 156; 710/266, 262

(56) References Cited

U.S. PATENT DOCUMENTS

| | | | |
|---|---|---|---|
| 3,950,735 | * | 4/1976 | Patel .................................. 340/172.5 |
| 4,040,097 | * | 8/1977 | Mizuno .................................... 360/2 |
| 4,103,326 | * | 7/1978 | Shenfield .............................. 364/200 |
| 4,480,217 | * | 10/1984 | Robbins et al. ....................... 318/618 |
| 4,507,592 | * | 3/1985 | Anderson .............................. 318/268 |
| 4,514,771 | * | 4/1985 | Stark et al. ............................. 360/73 |
| 4,530,018 | * | 7/1985 | Hoshino et al. ......................... 360/73 |
| 4,566,092 | * | 1/1986 | Gérard et al. ........................... 369/59 |
| 4,618,897 | * | 10/1986 | Johnson et al. ......................... 360/15 |
| 4,639,863 | * | 1/1987 | Harrison et al. ....................... 364/200 |
| 4,641,294 | * | 2/1987 | Yoshinaru .............................. 369/32 |
| 4,658,307 | * | 4/1987 | Tsuyuguchi et al. ................... 360/69 |
| 4,669,004 | * | 5/1987 | Moon et al. ............................ 360/77 |
| 4,725,968 | * | 2/1988 | Baldwin et al. ...................... 364/550 |
| 4,807,180 | * | 2/1989 | Takuchi et al. ....................... 395/425 |
| 4,811,280 | * | 3/1989 | Berkowitz et al. ................... 395/425 |
| 4,872,107 | * | 10/1989 | Marple et al. ........................ 364/200 |
| 4,910,614 | * | 3/1990 | Arai et al. .............................. 360/69 |
| 4,928,193 | * | 5/1990 | Agoglia et al. ................... 364/236.2 |

OTHER PUBLICATIONS

Applicants' Information Disclosure Memorandum (pp. 1–31).

(List continued on next page.)

*Primary Examiner*—Daniel H. Pan
(74) *Attorney, Agent, or Firm*—Shawn B. Dempster

(57) ABSTRACT

The software system architecture supports a rotating media in the storage and retrieval of data, where the rotating media stores in data tracks of multiple sectors, through the use of a microcontroller for the execution of a control program that schedules plural control tasks temporally distributed for respective execution during the rotational period of a predetermined track and sector. The scheduling of the plural control tasks is synchronized with respect to data retrieved from the predetermined sector. The plural control tasks include a rotational control task for determining an adjustment to the spin speed of the rotating media, a track following task for determining an adjustment to the alignment of the read/write head with respect to the predetermined track and a sector timing task for determining the position of the read/write head with respect to the predetermined track. The sector timing task also provides for scheduling the rotation control and track following task for execution during discrete intervals during the rotational period of the predetermined sector as well as scheduling the re-execution of the sector timing task with respect to the rotational period of another predetermined sector.

8 Claims, 17 Drawing Sheets

OTHER PUBLICATIONS

Declaration of John P. Squires.
Declaration of C. Scott Holt.
Declaration of Christopher J. Gintz.
Declaration of Donald W. Clay.
Declaration of Thomas A. Fiers.
Declaration of F. Mark Stefansky.
Letter from Finis F. Conner to Compaq Computer Corporation.
Donald F. Johann, "Microprocessor Applications in Disk Storage Systems," IEEE Transactions on Magnetics, vol. MAG–14, No. 4, Jul. 1978, pp. 203–206.*
David F. Stout, Microprocessor Applications Handbook, 1982, pp. 17:13–17:16, McGraw–Hill, Inc.*

* cited by examiner

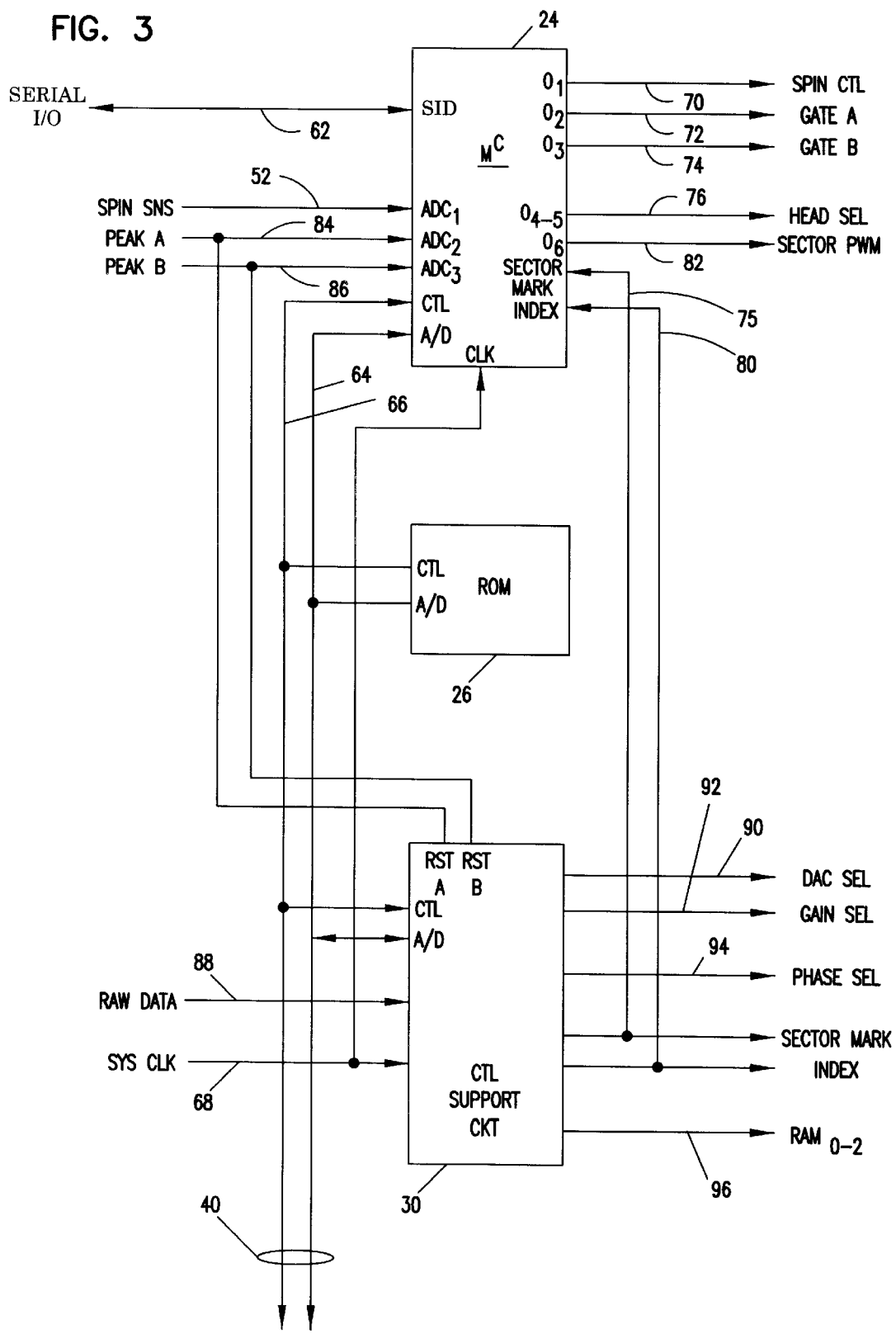

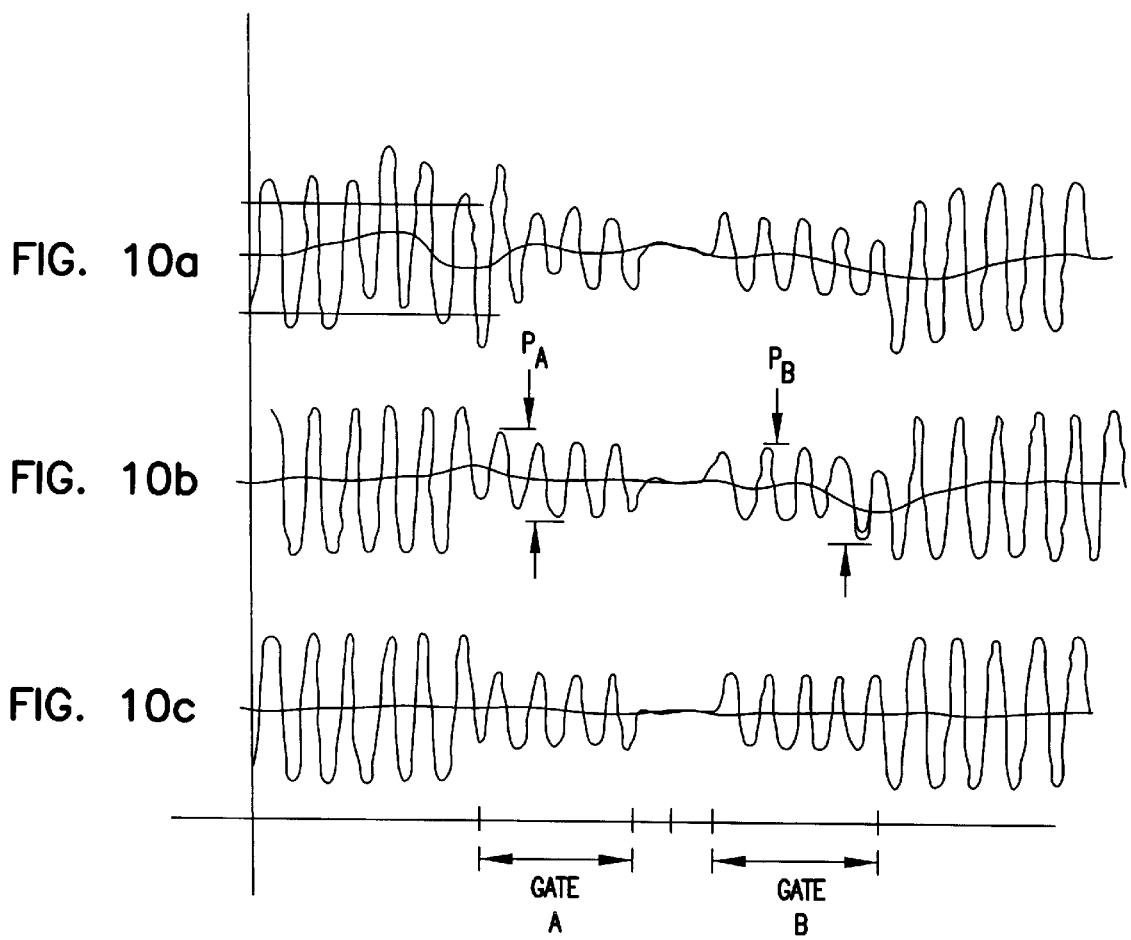

FIG. 12
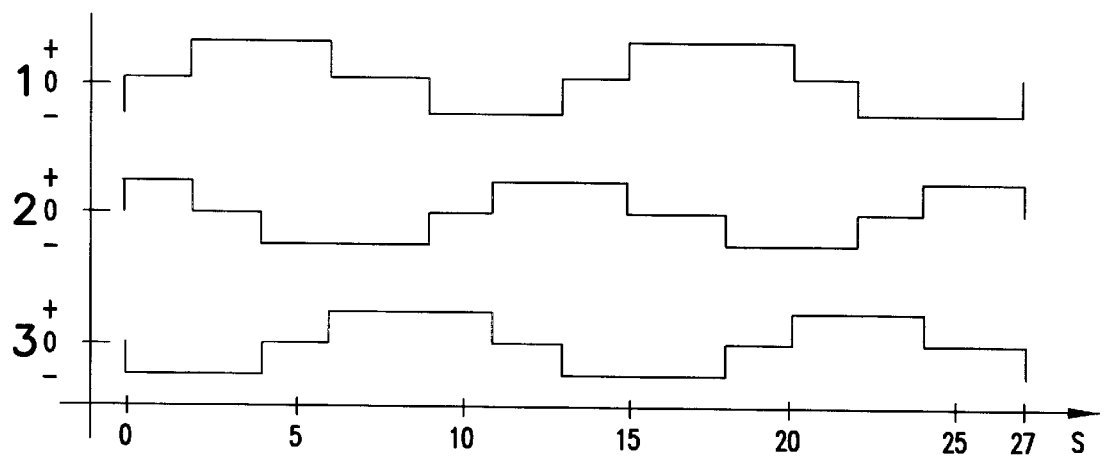
FIG. 13A
FIG. 13B
FIG. 13C
FIG. 13D
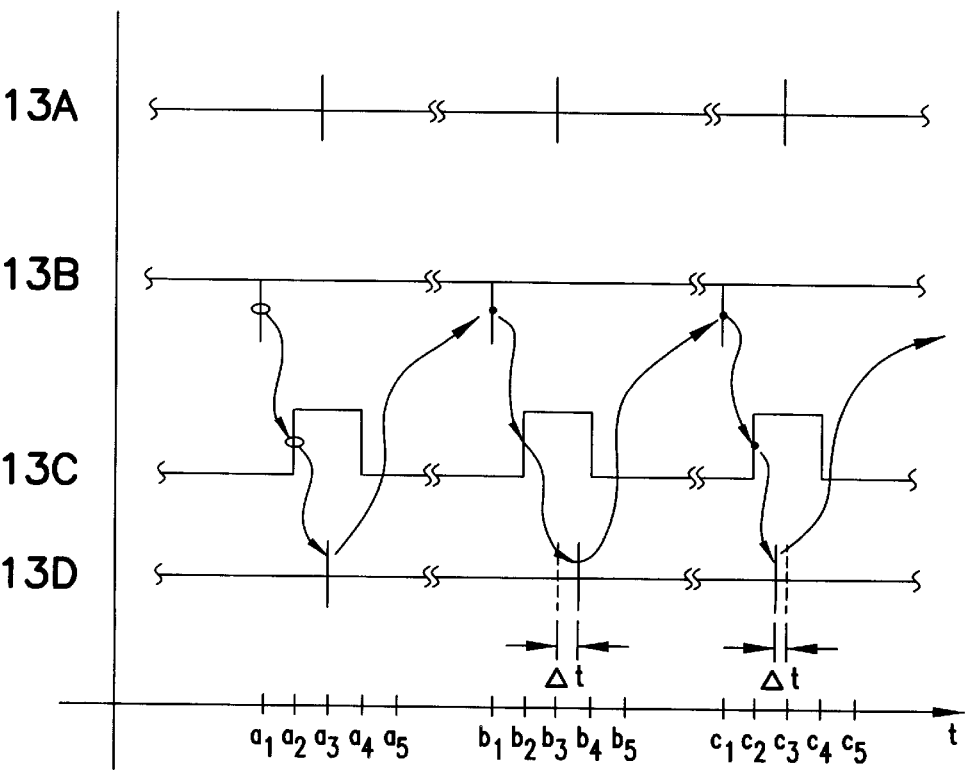

PROGRAMMABLE MICROCONTROLLER ARCHITECTURE FOR DISK DRIVE SYSTEM

CROSS-REFERENCE TO RELATED APPLICATIONS

This application is a continuation of Ser. No. 07/790,008, filed Nov. 4, 1991, now abandoned, which is a continuation of Ser. No. 07/448,386, filed on Feb. 23, 1990, now abandoned, which is a continuation of Ser. No. 07/057,806 filed Jun. 2, 1987, now abandoned.

The present application is related to the following Applications, all assigned to the Assignee of the present Application:

1. DISK DRIVE SYSTEM CONTROLLER ARCHITECTURE, invented by J. P. Squires et al, Application Ser. No. 07/057,289, filed Jun.2, 1987 now U.S. Pat. No. 4,979,056;

2. DISK DRIVE CONTROLLER ARCHITECTURE UTILIZING EMBEDDED REAL TIME DIAGNOSTIC MONITOR, invented by J. P. Squires, Application Ser. No. 07/058,289, filed Jun. 2, 1987 now abandoned;

3. ACTUATOR FOR DISK DRIVE, invented by F. M. Stefansky, Application Ser. No. 07/056,602, filed May 29, 1987 now abandoned;

4. LATCH MECHANISM FOR DISK DRIVES, invented by F. M. Stefansky et al, Application Ser. No. 07/056,142, filed May 29, 1987 now abandoned;

5. DISK DRIVE ARCHITECTURE, invented by F. M. Stefansky et al, Application Ser. No. 07/056,584, filed May 29, 1987 now abandoned.

6. METHOD AND APPARATUS FOR BRUSHLESS DC MOTOR SPEED CONTROL, invented by J. P. Squires et al, Application Ser. No. 06/880,754; filed Jul. 1, 1986; now abandoned.

FIELD OF THE INVENTION

The present invention is generally related to rotating media type data storage devices and, in particular, to a software system for controlling secondary mass data storage devices typically employing rotating magnetic media for the storage and retrieval of data in support of high-performance data processing systems.

BACKGROUND OF THE INVENTION

There has been and continues to be an ever-creasing demand for secondary mass storage peripherals capable of storing ever greater amounts of data in machine-readable form. This desire is coupled to a need to concurrently decrease the average time required to access any particular stored data. In addition, there is the commercial necessity to also reduce the costs associated with such secondary mass data storage devices.

Advances in the development of conventional hard-disk drive type data storage peripherals have been made to generally satisfy, albeit temporarily, the aforementioned desires. The principal gains in total data storage capability come from improvements in the achievement of linear recording bit densities in excess of 14,000 flux changes per inch and track densities of greater than 1,000 per inch. Some gains in the reduction of average access times have come from mechanical improvements in the actuator arm design and construction. Some measurable gains have also been achieved through the utilization of dedicated electronic controllers to manage actuator seek operation and thereby yield a net reduction in the average access time. This use of dedicated hardware is often extended to provide dedicated control of the spin motor rate of rotation and the closed loop actuator control needed to precisely follow a single track. This extended use of dedicated electronic control hardware is generally encouraged since it broadly reduces the cost of manufacture and assembly of disk drives.

Unfortunately, the use of dedicated electronic hardware architecturally reduces the design, initial setup and long term operative flexibility of the disk drive. Unique trimming or tailoring of the electronic and mechanical components of a disk drive, particularly with respect to one another, is sacrificed for the low cost mass producibility of the dedicated electronic control hardware.

The use of non-dedicated electronic hardware in place of dedicated hardware also raises problems. The coordination of multiple active processors in real-time is difficult and the multiplicity of hardware, both of the processors and the coordinating control logic, increases complexity and cost. Alternately, the utilization of a single active processor in place of the dedicated hardware is conventionally avoided due the apparently necessary intricacy of the diverse control functions that must be performed each in real time. Further, each function must be performed in the very limited real-time available every time the function is required to avoid corrupting the subsequent operation of the system.

SUMMARY OF THE INVENTION

A purpose of the present invention is therefore to realize a highly flexible disk drive control system utilizing a single active processor that, by the architectural design of its embedded software, operated reliably in real time and retains a high degree of flexibility while remaining imminently mass producible at low cost.

This is achieved in the present invention by the provision of a control architecture for supporting a rotating media in the storage and retrieval of data, where the rotating media stores data in tracks of multiple sectors. The control architecture is implemented utilizing a microcontroller capable of executing control tasks and a control program that schedules plural control tasks temporally distributed for respective execution during the rotational period of a predetermined sector. The scheduling of the plural control tasks is synchronized with respect to data retrieved from the predetermined sector.

The plural control tasks include a rotation control task for determining an adjustment to the spin speed of the rotating media, a track following task for determining an adjustment to the alignment of the a read/write head with respect to the predetermined track and a sector timing task for determining the position of a read/write head with respect to the predetermined track. The sector timing task also provides for scheduling the rotation control and track following tasks for execution during discrete intervals during the rotational period of the predetermined sector as well as scheduling the re-execution of the sector timing task with respect to the rotational period of another predetermined sector.

Thus, an advantage of the present invention is that all of the required support process can be realized in real time while utilizing only a single microcontroller.

Another advantage of the present invention is that maximum usage of the microcontroller's execution capability is obtained through the temporally based scheduling of the control tasks. Very little execution time is devoted to determine the next task for performance and whether any required information or data is not yet available, as is typical of conventional real time process control.

A further advantage of the present invention is that the temporally based scheduling of tasks is synchronized to the occurrence of data on the rotating media under normal operating conditions, thereby allowing the task scheduling vary with each sector period to preserve, under a wide range of environmental change, the operating margins needed to complete each task and realize a successful operation with respect to the processing of each data sector.

Still another advantage of the present invention is that it allows for an optimal portion of the rotating media control processed to be implemented in the software control program of the microcontroller to minimize the complexity and extent of the microcontroller's complement of support hardware.

BRIEF DESCRIPTION OF THE DRAWINGS

These and other attendant advantages and features of the present invention will become apparent and readily appreciated as the same becomes better understood by reference to the following detailed description of the invention when considered in conjunction with the accompanying drawings, in which like reference numerals designate like parts throughout the figures thereof, and wherein:

FIG. 3 provides a block diagram of microcontroller and the system support digital sections of the control system of the present invention;

FIGS. 10a–c are successively processed raw data waveforms associated with an A/B burst;

FIGS. 11b–d are diagrams of actuator current versus time for the respective seek operations illustrated in FIG. 11a;

FIG. 12 is a timing diagram illustrating the commutation of a three-phase DC motor utilized to drive the rotating media in a preferred embodiment of the present invention;

FIGS. 13a–d are a diagram illustrating the relation between the spin commutation period and the rotational speed of the rotating media in accordance with the present invention;

DETAILED DESCRIPTION OF THE INVENTION

I. System Overview

Figure 1:
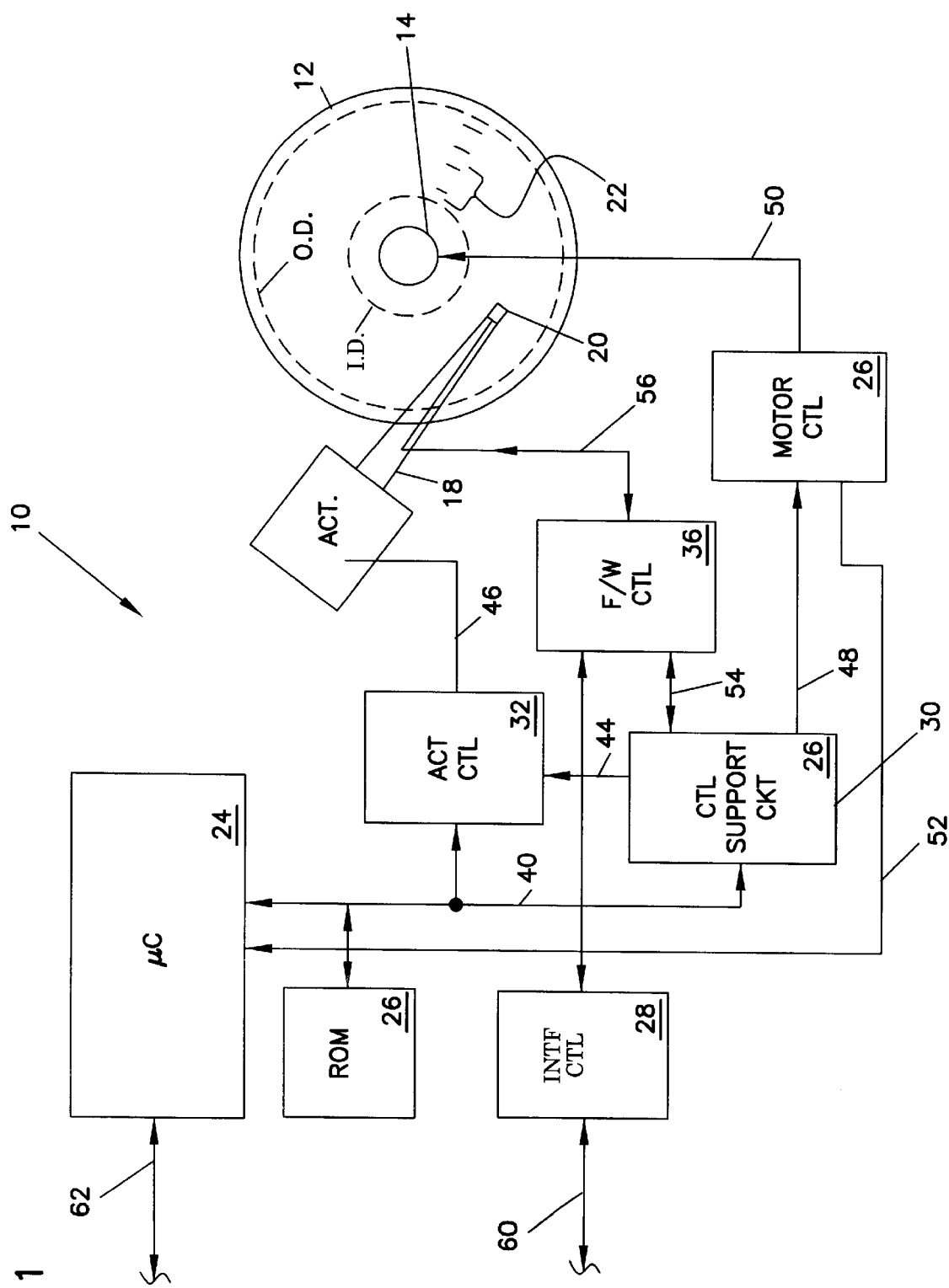
FIG. 1 is a simplified block diagram of the control system and its relationship to the actuator and rotating media in accordance with a preferred embodiment of the present invention.

A disk drive system controller, generally indicated by the reference numeral 10 and having a system control architecture consistent with the principals of the present invention, is shown in FIG. 1. The preferred embodiments of the present invention utilize the system controller 10 to operate a rotating data storage media, such as a plated magnetic disk 12, driven by DC, commutatorless spin motor 14, and to control an actuator 16 for the proper positioning of an arm 18 and one or more heads 20 so that data may be written to or read from a selected concentric track provided on the magnetic surface of the disk 12 for the storage of data. The mechanical structure, mechanical support and electromechanical operation of the rotating media 12, DC spin motor 14 and actuator assembly 16, 18, 20 is described in detail in the related applications DISK DRIVE ARCHITECTURE, ACTUATOR FOR DISK DRIVE and LATCH MECHANISM FOR DISK DRIVES noted above or related applications. These applications and the subject matter contained therein are hereby incorporated by reference. The distinctive mechanical and electromechanical aspects of the preferred embodiments of the present invention are the use of an essentially flat baseplate for the mounting of spin motor and actuator assemblies. The baseplate is flexibly attached to a faceplate. A cover encloses the baseplate and assemblies and is sealed to the faceplate. The spin motor assembly included the spin motor 14 and one or more hard disk plates as the rotating media 12. The hard disk plates employ a plated magnetic layer on a 95 millimeter diameter substrate (a so-called 3.5 inch disk) to record concentric data tracks on both disk surfaces having, in alternate embodiments, 27 and 33 sectors per track to obtain data rates of eight and ten megabits per second, respectively at a disk spin speed of 3600 revolutions per minute. Each track sector is formatted to provide embedded servo information and a data storage capacity of 512 bytes of data. All of the disk surfaces are available for the recording of data due to the use of the embedded servo information. Using two to eight surfaces, formatted data storage capacities of 20 to over 100 megabytes can be readily achieved within a 3.5 inch, half-height form factor. Finally, due to the minimum rotating mass, and therefore reduced bearing friction, an efficient actuator voice coil driver and the minimal system controller electronics, the total power dissipation of the preferred embodiments is less than 7.7 watts, and more typically about 5 watts.

The system controller 10, in the preferred embodiments of the present invention, performs all of the essential support processes necessary to permit an external host, typically a data processing system (not shown), to store and retrieve data from the rotating media 12. The central component of the system controller 10 is a microcontroller 24. In the preferred embodiments of the present invention, the microcontroller 24 is realized s Motorola MC68HC11 HCMOS single chip microcomputer. This particular microcontroller 24 is described in the Motorola Semiconductor Technical Data Book for the MC68HC11A8 HCMOS single chip Microcomputer Technical Data Book (ADI 1207) available from Motorola, Incorporated, Motorola Literature Distribution, P. O. Box 20912, Phoenix, Ariz. 85036. A read only memory (ROM) 26, coupled to the microcontroller 24 by an address, data and control bus 40, is utilized to store a control program for the microcontroller 24. As will be described in greater detail below, this control program provides for the support of five principal tasks by the microcontroller 24. These tasks include interface, actuator spin motor, read/write and monitor. An interface controller 28 is provided to support the microcontroller 24 in carrying out the interface task. The interface controller 28, in a preferred embodiment of the present invention, is an Adaptec AIC-500 Small System Computer Interface (SCSI) interface controller chip as manufactured and distributed by Adaptec, Incorporated and described in the AIC-500 SCSI Interface Controller Data Sheet number 50000X-00 available from Adaptec, Incorporated, 580 Cottonwood Drive, Milpitas, Calif. 95035. The interface controller 28, in general, is required to provide the hardware interface capability to support a communications bus 60 for the transfer of commands and data between the system controller 10 and the external host.

Hardware support of the actuator task of the microcontroller 24 is provided by the actuator controller 32. Directed by the microcontroller 24 through the provision of control signals and data via the address data and control bus 40, the actuator controller 32 drives the electromagnetic positioning voice coil of the actuator 16 by the selection of an appropriate voice coil current drive level provided to the actuator by lines 46. The spin motor task is supported in hardware by the motor controller 34. A preferred motor control circuit and the principles of its operation are disclosed in Method and Apparatus for Brushless DC Motor Speed Control J. P. Squires, et at, Ser. No. 06/880,754, filed Jul. 1, 1986, now abandoned, and is expressly incorporated by reference. In brief, the motor controller 34 provides for the generation of the multiphase DC motor commutation signals to the DC spin motor 14 via the motor winding drive lines 50. An analog feedback signal (SPIN SNS) is provided via line 52 to the microcontroller 24.

Finally, the read/write task is supported in hardware by a read/write controller 36. The principal functions of the read/write controller 36 are data buffering, encoding/decoding serialization, deserialization and data clock recovery. Serialized data is transferred to and from the read/write heads 20 of the actuator assembly 16, 18, 20 via data lines 56. The read/write controller 36 is controlled by and exchanges parallel data with the microcontroller 24 via the address, data and control bus 40.

Additional hardware support for the actuator controller 32, motor controller 34 and read/write controller 36 is provided by a control support circuit 30. The functions of the controller support circuit 30 are generally to process sector servo bursts and to provide latched control signals to the actuator, spin motor and read/write controllers 32, 34, 36 via control lines 44, 48, 54.

II. Sector-Data Storage Overview

Figure 2A:
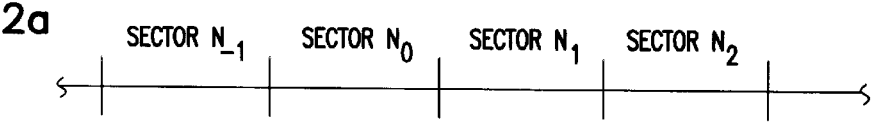
FIGS. 2a–e present a diagrammatic explosion of the format and constituency of a track sector in accordance with the preferred embodiment of the present invention.

Consistent with conventional disk drive data storage schemes, data is stored on the rotating media 12 of the present invention on concentric tracks centered about the spin axis of the media. Where there are multiple media surfaces for the recordation of data, data cylinders are defined as consisting of those tracks having a common spin radius. The tracks themselves are divided into track sectors defined as lying within a fixed radial arc. A portion of a single track is diagramed in FIG. 2a as a linear series of sectors. A single sector $N_0$, is exploded in FIG. 2b, as generally indicated by the solid lines between the Figures, to show its principal constituent data fields. In order, each sector, consistent with the present invention, is composed of a servo burst followed by a synchronization, a sync, field, a sector address header field, another sync field, a data field providing for the storage of typically 512 data bytes, and an error correction code (ECC) field. The ECC field is typically followed by an intersector gap extending to the beginning of the next sector's servo burst field.

Figure 2B:
Figure 2C:
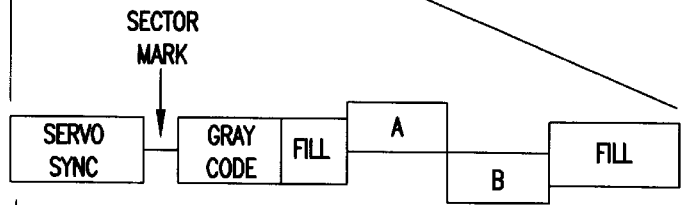

The servo burst field of FIG. 2b is shown exploded into its constituent parts in FIG. 2c, as generally indicated by the solid lines between the Figures. The initial field is a servo sync field that serves to allow the microcontroller 24 to generally synchronize itself, in real-time, to the servo burst field. Sector mark and grey code fields then follow in succession. The sector mark field is defined as a complete absence of servo data followed by a data transition. In the preferred embodiments of the present invention, and sector mark is represented as the first transition following the absence of any servo data for at least three servo sync clock cycles. By timing the period between detected sector marks, the rotational speed of the media 12 can be gauged quite accurately. The grey cod field that immediately follows the sector mark is an FM encoded digital value representing the track or cylinder number of the sector currently under a head 20.

After a filler field, A/B Burst fields are provided. As diagrammatically shown, the A/B Burst fields are non-overlapping and are physically written on the media 12 offset from the center line of the track. In the preferred embodiment of the present invention, the A/B Burst fields are both written utilizing a constant frequency and head voltage amplitude. This permits any difference in the relative head voltage amplitude, upon each subsequent reading of the respective A/B Bursts to be utilized as an indicator of the position of the head 20 relative to the center line of the track. Finally, a filler sync field completes the servo burst field.

III. Microcontroller Software Architecture Overview

Figure 2D:
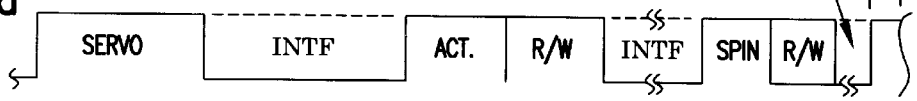
Figure 2E:
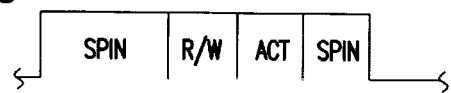

The control program provided in the ROM 26 enables the microcontroller 24 to support the complex and diverse processes of actuator control, spin motor control, read/write control and interface control, all in real time. The software architecture of the control program establishes the interface process as a foreground, or nominally executing, task. The execution of the interface task requires the microcontroller 24 to support the interface controller 28 in the performance of commands received from the external host and in the coordination of data transfers between the interface and read/write controllers 28, 36. The actuator, spin motor and read/write processes are supported as background tasks of nominally equal priority as between one another and higher priority with respect to the foreground interface task. The nominally equal priority of the background tasks is achieved by scheduling the execution of each of the tasks throughout the rotational period of each sector or sector period as generally shown in FIG. 2d, as generally indicated by the solid lines between the Figures. Where the actual sector period is not available, such as when rotating media 12 is stopped or not rotating at full speed, a default sector period is used. A sector task, composed of subtasks, including spin motor, read/write, and actuator tasks is initiated during the sector gap prior to the beginning of the servo burst of each sector, as generally indicated by the dashed line between the FIGS. 2b and 2d. The subtasks of the sector include commutating the spin motor 14, recognizing any new or pending messages from the interface process, and scheduling the initiation of actuator, spin motor and read/write process tasks during the current sector period, as generally indicated in FIG. 2e; an explosion of the sector task of FIG. 2d as generally indicated by the solid lines between the Figures. In the preferred embodiments of the present invention, the actuator task is initiated by setting a timed interrupt to occur at about one-eighth of the duration of the sector period from the beginning of the current sector. At about the midpoint to the sector period, a second timed interrupt is set to occur to initiate the spin motor task. Finally, a timed interrupt to reinitiate the sector task will be set to occur during the sector gap at the end of the current sector period. The timing of this last timed interrupt is chosen to control the spin motor. Depending on whether there is a new or pending read/write operation requested by the interface task, either or both of the actuator and spin motor tasks will chain, in the preferred embodiments of the present invention, directly to the read/write task to perform any required read/write operation. The sector and read/write tasks, and the actuator and spin motor tasks if they do not chain respectively to the read/write task, will each end by the execution of a return-from-interrupt microcontroller instruction that will restore the interrupted foreground interface task to active execution. Consequently, essentially all of the available microcontroller processing capability is utilized in the performance of the processes necessary to implement the essential functions of the system controller 10. There is no execution time wasted in the performance of task scheduling operations or other overhead functions as is typically required in conventional multi-tasking computer systems. Rather, the present invention achieves real time responsive, multi-tasking operation through time-based scheduling of the sector, actuator, spin motor and read/write processes.

IV. Digital System Controller

Referring now to FIG. 3, the microcontroller 24 supports a muliplexed address and data bus 64 and a control bus 66 as its principal means of communicating to the various higher level components of the system controller 10. The buses 64, 66 also permit the microcontroller 24 to obtain its control program instructions and initialization data from the ROM 26. A system clock signal (SYS CLK) nominally running at 16 megahertz, is provided on a clock line 68. In order to monitor and control various other elements of the control system 10, and microcontroller 24 sources a spin control signal (SPIN CTL) via line 70 to the motor controller 34, Gate A and B signals on lines 72, 74 to enable the detection of the A/B Burst, and head selection signals via line 76 to select a specific one of the potentially multiple, typically four, read/write heads 20 for use in a current read or write operation. The microcontroller 24 will receive a sector mark signal via line 78 from the control support circuit 30 when a sector mark is physically detected from the rotating media 12. On recognition of a proper sector mark, the microcontroller 24 will source a read/write timing signal (Sector PWM), via line 82, to synchronize the read/write controller 36 with the current sector. If the sector for which the current sector mark is determined to be the index sector of the current track, the microcontroller 24 will provide an index signal via line 80 from the controller support circuit 30 for the duration of the current index sector period.

The microcontroller 24 received the analog spin sense signal (SPIN SNS) via line 52 at an input of an internal analog-to-digital converter within the microcontroller 24. The spin sense signal is a voltage feedback signal indicative of a motor winding characteristic, such as current, provided by the motor controller 34. Other analog inputs of the internal analog digital converter receive analog Peak A and Peak B signals via lines 84, 86. The Peak A and Peak B signals are indicative of the respective A and B burst amplitudes from the A/B Burst Fields of the current sector.

The controller support circuit 30 is principally provided to perform low-level, high speed functions that could not conveniently performed directly by the microcontroller 24. These high-speed functions include detecting the occurrence of a sector mark and capturing the grey code value read from the grey code field of the current sector. Otherwise, the controller support circuit 30 operates as a simple latched output port expander for the microcontroller 24. The sector mark and grey code capture functions are driven by raw, clock separated data received from the read/write controller 36. The controller support circuit 30, functioning as a latched output port for the microcontroller 24, provides actuator enable the actuator gain select signals, via lines 90, 92 to actuator controller 32. Similarly, commutation phase select signals are provided, via line 94, to the motor controller 34 and ram bank select signals, via lines 96, are provided to the read/write controller 36.

Figure 4:
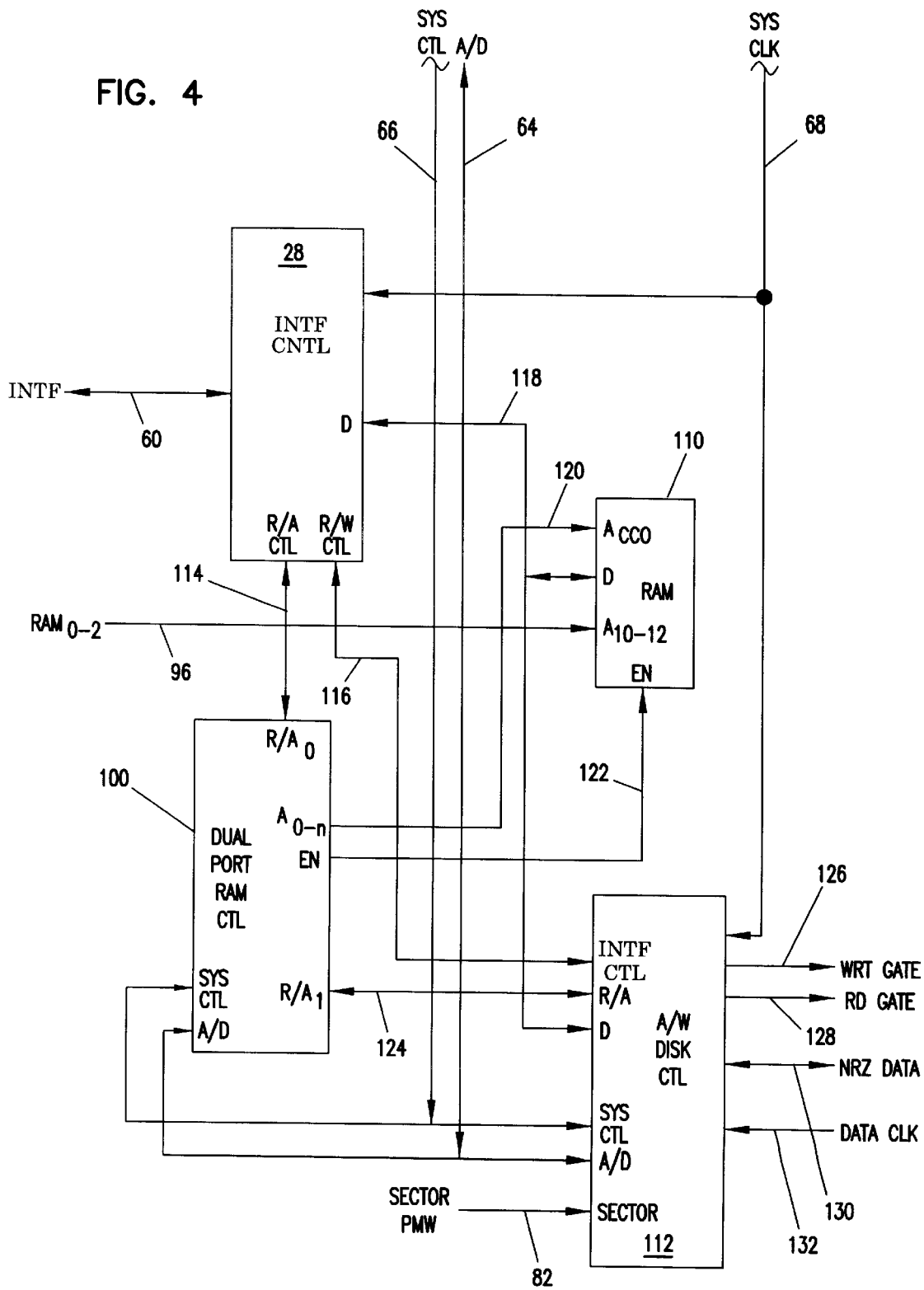
FIG. 4 provides a block diagram of the interface and digital control and data buffered section of the read/write controller of the present invention.

The interface controller 28 and the control and data buffering portion of the read/write controller 36 are shown in FIG. 4. The dual port ram controller 100 and the read/write disk controller 112 are preferably the Adaptec AIC-300 Dual Port Buffer Controller and the Adaptec AIC-010 Winchester Controller Chips, both available from Adaptec, Incorporated. The buffer function itself is performed by a random access memory (RAM) device 110. In the preferred embodiments of the present invention, the RAM 110 is a static 64 kilobit, single CMOS memory chip organized as 8K by 8 bit.

The interface controller 28 implements at least the common core of the high-level SCSI protocols, thereby permitting the host to communicate with the system controller via a standard SCSI bus. Alternately, the interface controller 28 may implement the buffering control logic necessary to permit connection to a conventional "AT" IBM personal computer models type peripheral interface connector.

The disk controller 112 implement the control logic needed to support a low-level data channel circuit 300 (shown and described below with respect to FIG. 9) that completes the read/write controller 36. Read and Write Gate signals, enabled in timed response to the receipt of the sector PWM signal from the microcontroller 24, are provided via lines 126, 128 to enable respective raw data read and write operations. Non-return-to-zero (NRZ) data is biodirectionally exchanged with the data channel circuit 300 via data line 130. A data direction sensitive data clock signal (DATA CLK) is provided to the disk controller 112 via a data clock line 132. This data clock signal, as generated by the data channel circuit 300, is specifically synchronized to the raw data as read or written with respect to the rotating media 12.

The dual port RAM controller 100 coordinates all memory accesses of the RAM 110. Requests for RAM access are placed by the interface controller 28 via the request/acknowledge (R/A$_0$) control lines 114 and by the disk controller 112 via the separate request/acknowledge (R/A$_1$) control lines 124 to the dual port RAM controller 100. Data transfers between the interface controller 28, the RAM 110 and the disk controller 112 occurs over a dedicated data bus 118. RAM addresses and transfer enable control signals are generated by the dual port RAM controller 100 and provided to the RAM 110 via the address lines 120 and the enable control lines 122. High-order RAM addresses, acting as memory bank select signals, are provided to the RAM 110 from the controller support circuit 30 via address lines 96. All accesses by the microcontroller 24 to the RAM 110 are through the disk controller 112.

The primary flows of data occurring ultimately between the external host and read/write heads 20 are buffered through the RAM 110. Typically, a command or request for the transfer data will be placed by the external host to the interface controller 28 via the interface bus 60. The interface controller 28, performing the necessary hardware and software protocol handshaking to receive the command request, will place a formatted command request in a reserved portion of the RAM buffer 110. If data is being provided by the external host, the interface controller 28 will also provide for the transfer and storage of the received data into a buffer section of the RAM 110. The disk controller 112 is alerted to the presence of the pending command request by the interface controller 28 by the read/write control lines 116. The microcontroller 24 may monitor the state of the read/write control lines 116 by periodically interrogating an internal register of the disk controller 112 via the control and address data buses 66, 64.

To implement a pending command/request, the microcontroller 24 will access the RAM 110 via the disk controller 112 and dual port controller 110 to determine the nature of the command and whether the command may be honored. If honorable, the microcontroller 24 implements the command by programming and enabling the disk controller 112. If the command involves data provided by the external host to be transferred to the rotating media 12, the disk controller 112 is programmed by the microcontroller 24 as to the storage destination of the data and the quantity of data transfer. The disk controller 112 then obtains the data directly from the RAM 110, serializes the data and ultimately provides the data to the data channel circuit 248 via the NRZ data line 130.

If, however, the command request placed by the external host is for the transfer of the data from the rotating media 12, the microcontroller 24, again in response to the formatted command placed by the interface controller 28 in the RAM 110, will program the disk controller 112 to obtain the requested information from the sectors of the rotating media 12 specified by the command. When enabled, the disk controller will receive the data via the NRZ data line 130 and transfer the data into the buffer section of the RAM 110. On completion of the data transfer, or some unit portion thereof, the disk controller 112 will notify the interface controller 28 of the availability of the requested data by signal placed via the read/write control lines 116. The interface controller 28 will then initiate the hardware handshaking or software protocol signalling necessary to alert the external host of the availability of the requested data. One acknowledgement by the host, the interface controller 28, will transfer the buffered data from the RAM 110 to the interface bus 60.

A. The Microcontroller

Figure 5:
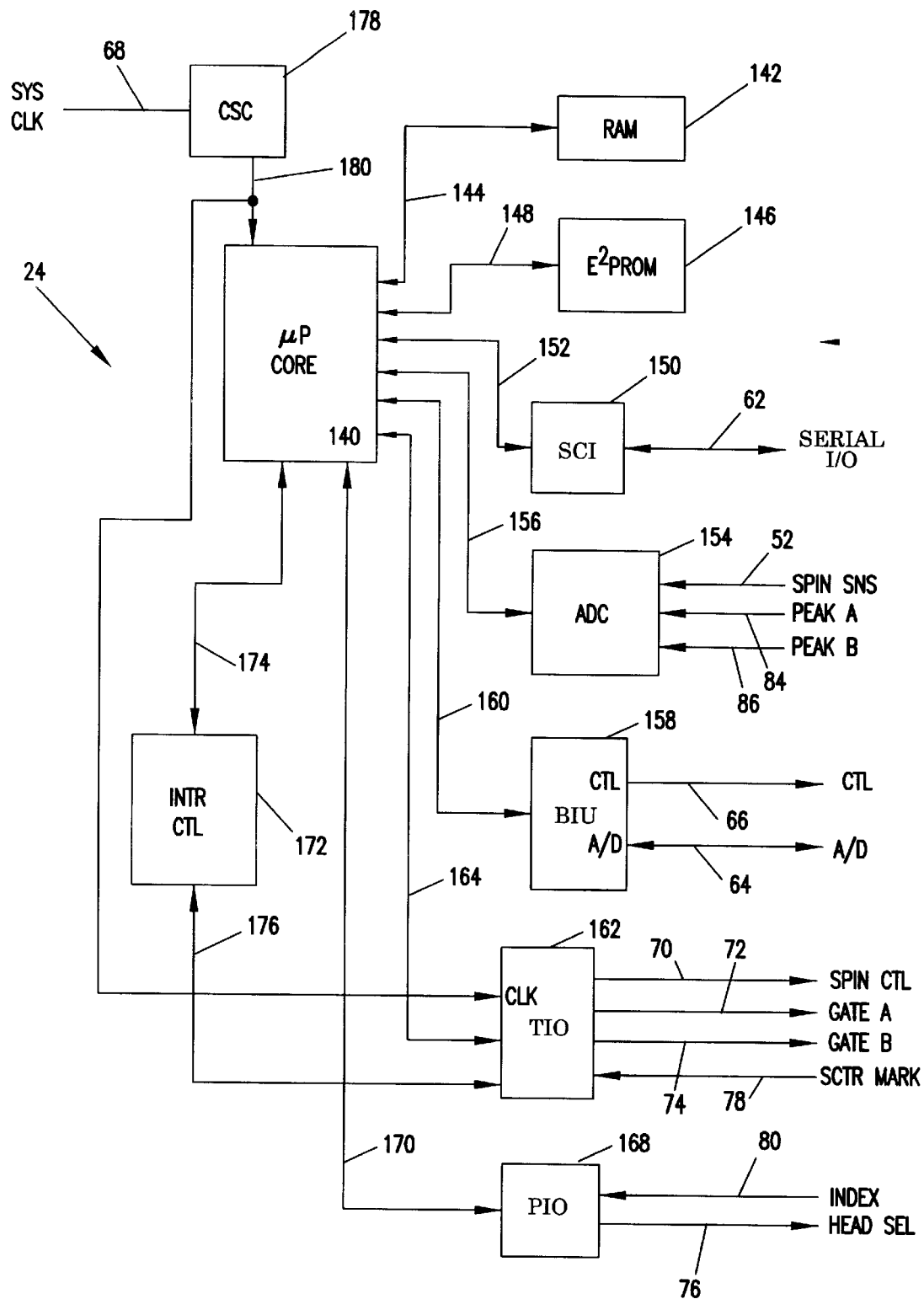
FIG. 5 is a detailed block diagram of the microcontroller preferred for use in conjunction with the present invention.

FIG. 5 provides a detailed block diagram of the sub elements of the microcontroller 24. Central to the microcontroller 24 is the microprocessor core component 140 that implements the standard functions of a conventional microcomputer, such as the Motorola 6800 family of microcomputers. The microprocessor core 140 is, however, extended to support its various on-chip peripheral devices. These peripheral devices include a 256 byte block of RAM memory 142 selectable as a source or destination of data by the microprocessor core 140 via control lines 144. An electrically erasable programmable read-only memory (EEPROM) 146, having a capacity of 512 bytes is accessible by the microprocessor core 140 for reading and writing (programming) via control lines 148. A serial communications interface (SCI) 150 is provided to support a standard asynchronous serial input/output bus 62 and thereby establish a communications route to and from the system controller 10 independent of the host interface bus 60. The aforementioned analog-to-digital conversion capability is realized as an analog-to-digital converter (ADC) 154 having an integral multiplexed input controlled by the microprocessor core 140 via control lines 156 to permit the separate receipt of the SPIN SNS, PEAK A and PEAK B analog signals via respective analog multiplexer input lines 52, 84, 86. A bus interface unit (BIU) 158, controlled from the microprocessor core 140 via control lines 160, is provided to support the multiplexed address and data bus 64 and to supply the system control signals in support thereof via the control bus 66. A timer input/output (TIO) unit 162, controlled by the microprocessor core 140 via control lines 164, provides a bank of digital timers. For purposes of the present invention, three such digital timers are utilized to provide for the programmatically timed generation of the spin control, GATE A and GATE B signals on line 70, 72, 74. A fourth counter of the TIO 162 receives the sector mark signal as generated by the controller support circuit 30 via lines 78 to permit the accurate timing of sector periods. A parallel input/output (PIO) unit 168 is utilized as a latched output port to provide and head select signals via lines 76 and to receive, as an input, the index signal, indicating whether the current sector is the index sector of the current track. The function of the PIO 168 is controlled by the microprocessor core 140 via the control lines 170. The final programmatically controlled unit of the microcontroller 24 is an interrupt controller 172. The various counters of the TIO 162 generate a respective interrupts when they reach a programmatically defined count value. These interrupts are respectively directed to the interrupt controller 172 via interrupt lines 176. The microprocessor core 140 is immediately called via interrupt controller lines 174, to service the interrupting event as identified by the respective interrupt that occurs. Finally, an on-chip oscillator 178 is provided to generate the internal timing signals required by the microprocessor core 140 and the TIO unit 162. The oscillator 178 receives the system clock signal via clock line 68 and, in turn, generates a microcontroller internal clock signal that is provided via internal clock line 180. Although not shown, the microcontroller 24 communicates with each of its on-chip addressable peripheral devices by way of an internal data bus.

B. Controller Support Circuit

Figure 6:
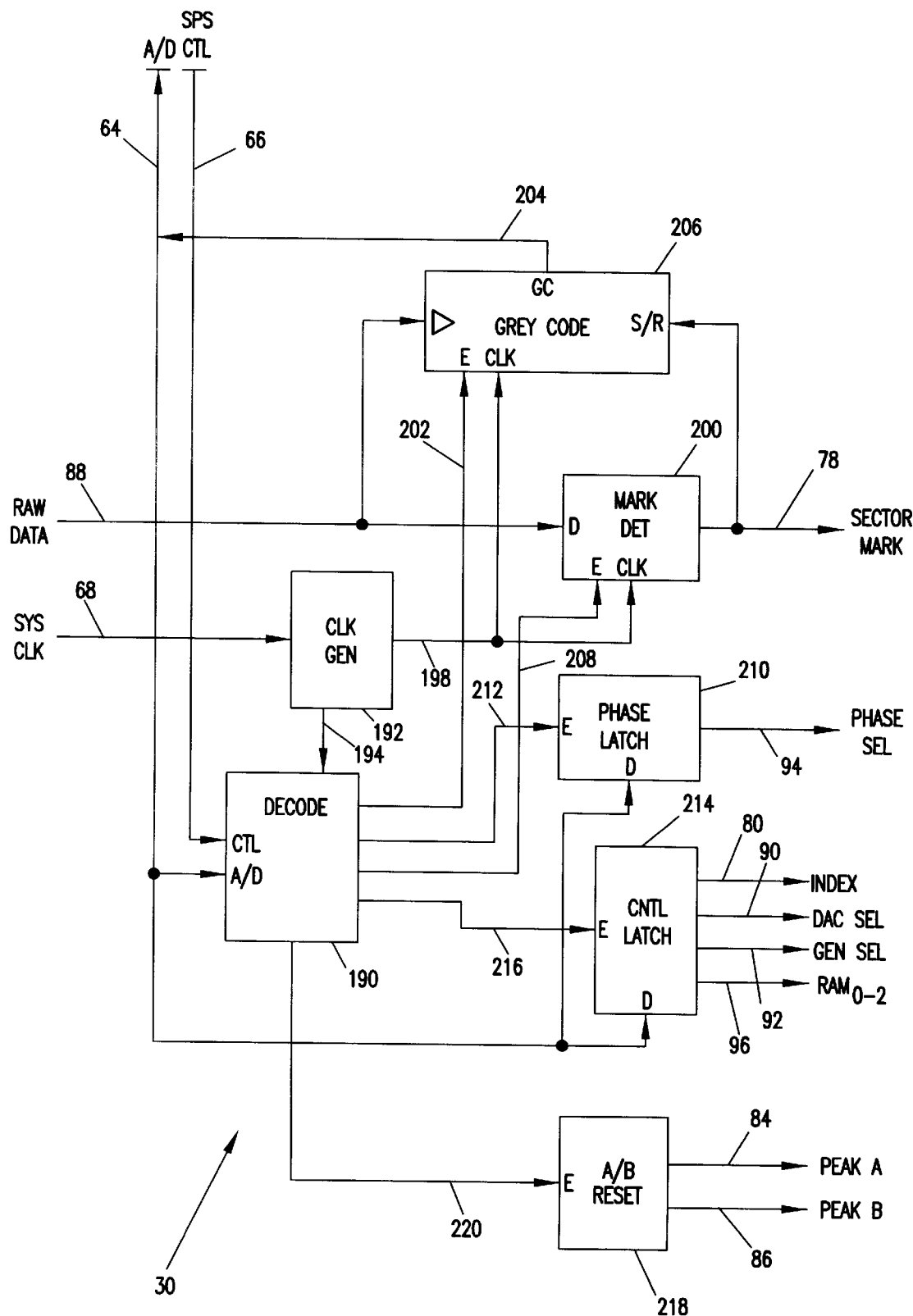
FIG. 6 is a detailed block diagram of the general system support digital hardware as implemented for a preferred embodiment of the present invention.

FIG. 6 provides a detailed block diagram of the minimal controller support hardware required by the present invention as realized in the controller support circuit 30. The microcontroller 24 programmatically accesses and controls the controller support circuit 30 via a decoder 190 coupled to the address and data and control buses 64, 66. A clock generator 192, driven by the system clock signal provided via clock line 68, synchronizes all operations of the decoder 190 by the provision of an internal clock signal via clock line 194 to the decoder 190. A sector mark detection circuit 200 is provided within the controller support circuit to perform the actual task of detecting the occurrence, in real time, of a sector mark. For this purpose, the mark detector circuit 200 receives the raw, clock separated, data signal provided from the low level data channel circuit 300 via the raw data input line 88 and a date clock counting signal from the clock generator 192 via clock line 198. The microcontroller 24 enables the mark detector 200 by accessing the decoder 190 to provide a search enable signal on line 203 and thereby initiate the beginning of a mark search. The mark detector circuit 200 fundamentally implements a clocked serial shift register circuit to that provides a signal on finding three successive data clock periods where there are no corresponding raw data transmissions. Immediately on detecting the occurrence of such a circumstance, the mark detection circuit generates a sector mark pule that is provided to the microcontroller 24 via the sector mark signal line 78. The mark detector circuit then goes inactive until enabled for the next sector mark search.

A grey code shift register is provided within the controller support circuit 30 to capture the grey code value as it is read from the grey code field. Generally, the grey code shift register is enabled by the microcontroller 24 at the same time that it initiates a sector mark search operation. However, for purposes of flexibility, the grey code shift register receives a separate enable signal from the decoder 190 via enable line 202. The grey code shift register 206 also receives the raw data from data line 88 and data clock signal from clock line 198 in parallel with the mark detector circuit 200. The grey code shift register 206 receives the sector mark signal from the mark detector circuit 200 to initiate with the very next clock period the acquisition of the raw data from the raw data line 88. Fundamentally, the grey code shift register implements a serial-to-parallel shift register function. The serial-to-parallel conversion is halted sixteen data clock cycles after being enabled in response to the sector mark signal. That is, the grey code is realized as a two byte value identifying the current read/write cylinder. In the preferred embodiments, only 10 bits of the grey code are utilized, with successive cylinders being assigned grey code values successively differing by only one bit. The two bytes of the grey code value are then available on the grey code parallel output bus 204 to the address/data bus 64 in response to respective output enable control signals from the decoder 190 via control lines 202. Thus, the controller support circuit performs the mark detection and grey code acquisition operation substantially unattended by the microcontroller 24, through requiring a minimum of hardware.

A phase latch 210 is provided in the controller support circuit 30 to support the spin motor controller 34. The phase latch 210 functions essentially as a digital latch for storing the phase winding value corresponding to the particular phase windings to be currently selected by the spin motor controller 34. The phase latch receives the phase value from the data bus portion of the address in data bus 64 on receipt of an enable from the decoder 190 via an enable control line 212. The latched phase value is then immediately provided on the phase selection output lines 48.

A digital control signal latch 214 is similarly provided to support the actuator and read/write controller 32, 36. A control word is written to the control signal latch 214 via the data bus portion of the address and data bus 64. The control word is latched by the control signal latch 214 on receipt of a latch enable signal from the decoder 190 via control line 216. The respective bits of the control word stored by the control signal latch are provided onto the index, actuator DAC select, gain select and RAM bank select control lines 80, 90, 92, 96.

Finally, an A/B reset circuit 218 is provided generally in support of the read/write controller 36. The A/B reset circuit 218 implements unlatched, open collector drivers that operate in response to a control signal from the decoder 190 via the control line 220. The outputs of the open collectors of the A/B reset circuit 218 are coupled to the analog signal lines PEAK A and PEAK B 84, 86.

V. Actuator Controller

Figure 7:
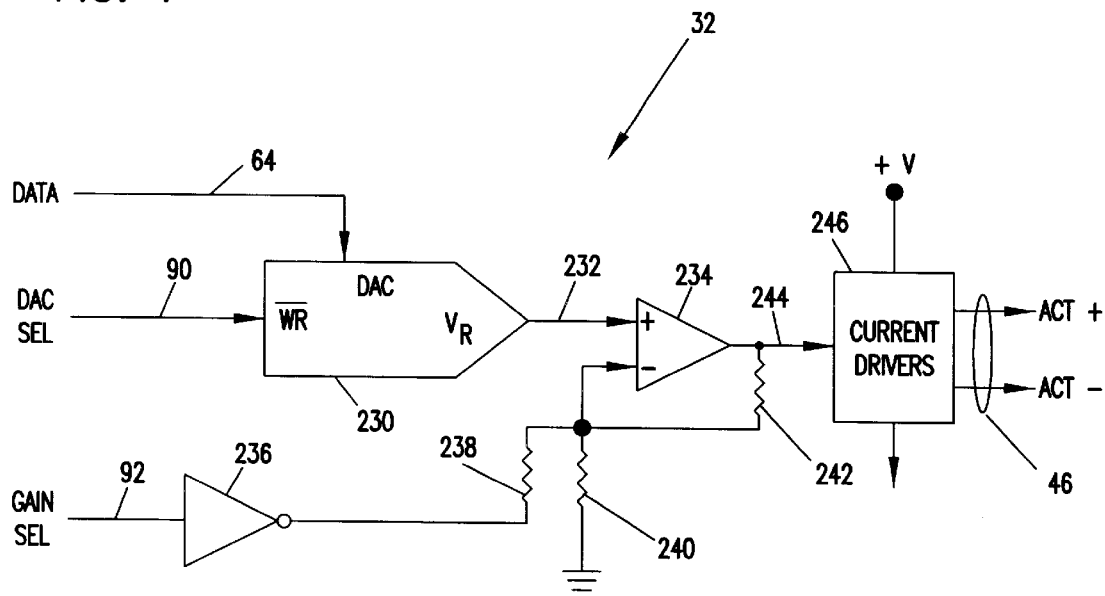
FIG. 7 is a schematic block diagram of a digital to analog converter/current driver circuit for controlling and adjusting the position of the actuator in accordance with the present invention.

The actuator controller 32 is shown in FIG. 7 in block diagram form. As disclosed in the above-identified application, Actuator for disk Drive, the preferred actuator for use in conjunction with the present invention utilizes a voice coil driver permitting continuous selection of the pivotal position of the actuator arm 18 and heads 20. In the preferred embodiments of the present invention, the actuator controller 32 utilizes an eight-bit latched-input digital-to-analog converter 230 to generate an analog voltage value proportional to the desired actuator position. The latched inputs of the digital-to-analog converter 230 are enabled and then latched in response to the actuator DAC select signal as provided on the DAC select line 90. A digital output value, 0, as determined by the mircrocontroller 24, is provided via the data but portion of the address/data bus 64 to the digital-to-analog converter 230 for latching and conversion. The resulting analog output signal is provided via the DAC output line 232 to the plus input of an operational amplifier 234 configured by the connection of resistors 240, 242 as a non-inverting amplifier having a gain value of approximately 2. The output of the operational amplifier 234 is provided via line 244 to a voltage following current driver circuit 246. Differential output lines 46 from the current driver 246 are connected to the two terminals of the actuator voice coil. The current driver 246 provides for a differential current on the lines 46 proportional to the voltage value at the output of the operational amplifier 234.

Since, in the preferred embodiment of the present invention, the data bus portion of the address/data bus 64 has a width of 8 bits, the resolution range of the digital-to-analog converter 230 and, therefore the current driver 246, is limited to 256. However, the actuator controller 32 is required to support two substantially different actuator related operations. These operations are seeking and track following. The seeking operation involves rapidly moving the heads 20 from one track of the rotating media 12 to a substantially different track. Seeking over any extended number of tracks optimally requires the application of very large current values to the actuator voice coil to minimize the total seek time. Conversely, the track following operation ideally involves very minute changes in the voice coil current as needed to closely follow a single track. Accordingly, the mircrocontroller 24 provides a gain select signal to the actuator controller 32 via gain select line 92 to alter, preferably by a factor of 4, the total range of obtainable voice coil currents. The gain select signal is provided to a open collector buffer 236 connected through a resistor 238 to the negative input of the operational amplifier 234. Consequently, the mircrocontroller 24 is capable of directly altering the gain factor of the operational amplifier 234 between fixed gain factors with a concurrent realization of a proportional increase in the range of selectable current values.

VI. Spin Motor Controller

Figure 8:
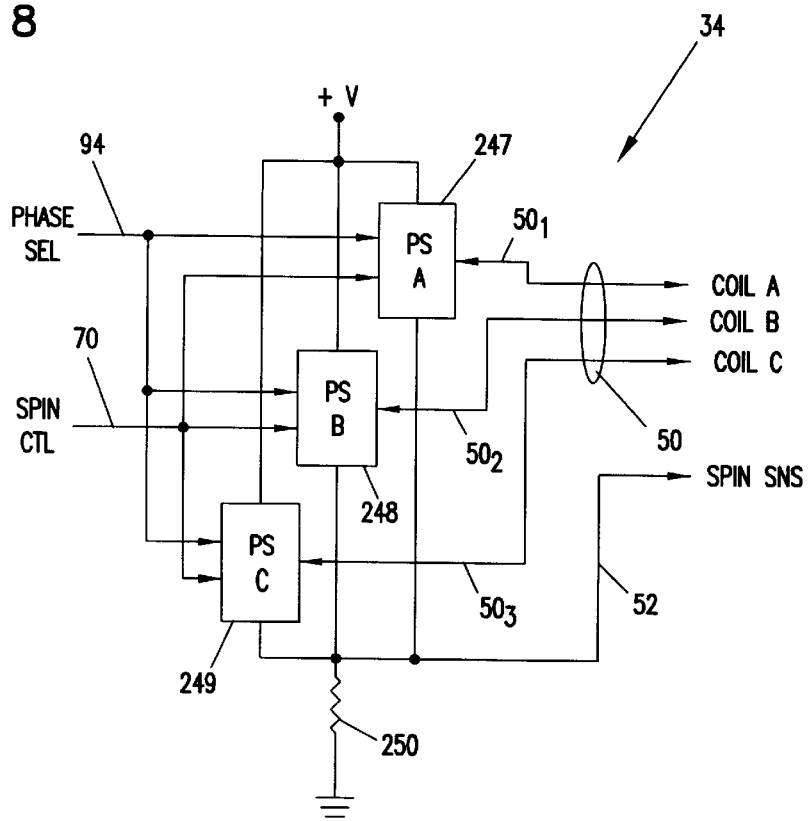
FIG. 8 is a block diagram of the motor control circuit utilized to select and adjust the rotational position of the rotating media in accordance with the present invention.

Referring now to FIG. 8, a block diagram of the motor controller 34 is shown. In the preferred embodiment of the present invention, the motor 14 is DC three phase commutatorless motor. The three commutation nodes of the phase coils, designated as nodes a, b, c, are driven by respective phase switches 247, 248, 249. The phase switches 247, 248, 249 are selectable to operate either as a current source, drawing current from a positive voltage supply, or as a current sink, with the current load being passed through the reference resistor 250. The voltage value of the SPIn SNS signal on line 52 is, therefore, directly proportional to the motor winding current level passing through the reference resistor 250. The phase select signal as provided by the phase latch 210 via the phase select control lines 94 determines whether the respective phase switches 247, 248, 249 are sourcing current, sinking current or set to a high output-impedance state on their output lines $50_1$, $50_2$, $50_3$. The switches 247, 248, 249 also receive the spin control signal, in common, via control line 70. The spin control signal either enables the phase switches 247, 248, 249 to be responsive to the phase select value provided on the phase select lines 94 or to be commonly disabled such that they each present a high output-impedance to the nodes a, b, c via coil winding lines $50_1$, $50_2$, $50_3$.

VII. Read/Write Controller Data Channel Circuit

Figure 9:
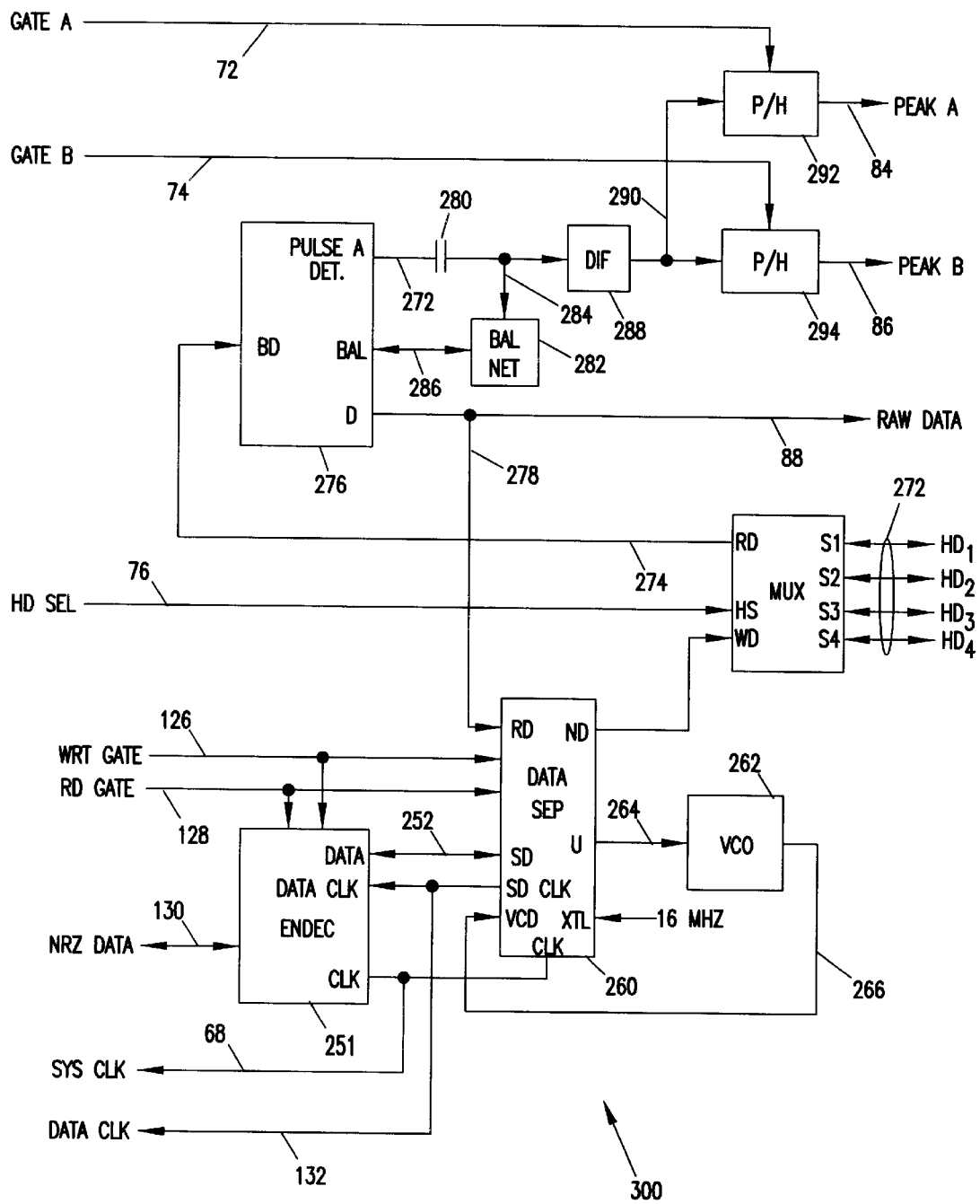
FIG. 9 is a detailed block diagram of the data channel circuitry utilized in a preferred embodiment of the present invention.

The low level data channel circuit 300, as shown in FIG. 9, supports the bidirectional transfer of data to and from the individual heads 20 of the actuator subassembly 16, 18, 20. In brief, the write data path for data being written to the rotating media is through an ENDEC 251 where the serial data is encoded, to a data separator 260 where the encoded data is combined with the data clock signal, and finally to a multiplexor 268 for routing to a specific head 20.

Similarly, the read data path begins with data, originating from a specific one of the heads, being selected for transfer to a pulse detector 276 for initial wave form shaping, to the data separator 260 for extraction of the read data clock signal and finally back to the ENDEC 251 for decoding back into NRZ data before being provided to the disk controller 112.

In greater detail, the ENDEC (preferably an AIC-270 2,7 RLL Encoder/Decoder available form Adaptec, Inc.) is responsive to the write and read gate signals generated by the disk controller 112 and provided via the control lines 126, 128. On receipt of the write gate signal, the ENDEC 251 begins converting NRZ data received from the disk controller 112 via NRZ data line 130 to a 2,7 RLL data format. The encoded data is then provided to the data separator 260. The data separator utilized in the preferred embodiments of the present invention is a conventionally constructed application specific integrated circuit (ASIC) utilizing the macro function libraries of Ferranti, Inc. (address). The data separator 260 and the voltage controlled oscillator (VCO) 262, together, are functionally equivalent to the National Semiconductor NS8462 Data Separator and a conventional crystal controller clock generator. The VCO 262 is preferably a discrete component voltage controlled oscillator, utilizing a charge pump to convert the input digital clock stream to a VCO control level, of conventional design. The use of a discrete component VCO design was chosen over the sue of the VCO internal to the NS8462 to permit a perceived greater control over the VCO's jitter tolerance specification. Another reason for choosing to use the data separator 260 was that it allowed pre-compensation to be used; pre-compensation is a conventional feature of disk drive data separators that is not available with the NS8462. Finally, the use of the ASIC ASIC data separator 262 allows a conventional 16 MHz crystal controlled clock generator to be placed on-chip. Since the NS8462 does not itself provide a clock generator function, an external, though conventional, clock generator would be needed.

The data separator 260 drives a 16 megahertz crystal to generate a controlled clock signal that is provided to the ENDEC 251 and the control system 10 in general via the system clock line system 68. The data separator 260 also provides the same system clock signal to its separated data (SD) clock line output and onto the data clock lines 132 in response to the write gate signal. The data separator 260 receives both the write and read gate signals via control lines 126, 128. The data clock signal is used by the ENDEC 251 as the basis for clocking encoded data from the ENDEC 251 to the data separator via the data line 252. The encoded data from the ENDEC 251 is combined with the data clock signal and provided to the multiplexor 268 via the write data line 270. The multiplexor 268 also receives the head selector control signals provided by the mircrocontroller 24 on select lines 76. In response, the multiplexor 268 routes the write data from the data separator 260 to a head select value corresponding one of the head data lines 272.

The reading of data from the rotating media 12 must serve two different by related purposes. The first, naturally, is reading the servo burst information from the beginning of every sector independent of whether a read write, or other data operation is to occur. The reading of a servo burst is largely controlled by the mircrocontroller 24. Again responsive to the head select value provided on the head select control lines 76, the multiplexor 268 routes data read from a specific head 20 and its corresponding head data line 272 to the multiplexor read data output line 274. The multiplexor 268, in addition to performing its signal multiplexor function, further performs as a conventional pre-amplifier for the data received from any of the head data lines 272. The amplified read data is then received by the pulse detector 276 (preferably a National Semiconductor NS8464 Pulse Detector, manufactured and distributed by National Semiconductor Corporation, 2900 Semiconductor Drive, Santa Clara, Calif. 90501 and described in the Advanced Peripheral Processor Solution Handbook No.1: Mass Storage National Semiconductor, 1986). After further amplification, the read data is passed from an analog output, A, of the pulse detector 276 through a DC clocking capacitor 280, preferably having a value of 0.01 microfarads, to a balanced network 282 via analog line 284. The balanced network 282, with the exception of the capacitor 280, is a conventional implementation of the required analog waveform shaping circuitry intended and suggested for use with the pulse detector 276. The shaped analog single is provided back to the pulse detector via analog line 286 for further analog signal processing and ultimate conversion to a digital serial data stream. The processed, digital version of the read data is then provide onto the raw data output line 88 from the pulse detector 276. This raw data is utilized by the controller support circuit 30 for synchronization, detection of the sector mark and for the extraction of the grey code.

The analog data stream passed through the capacitor 280 is also provided to a differentiator 288 before being provided to peak detector and hold circuits (peak hold) 292, 292 via analog lines 290. The peak hold circuits 292, 294 provide for the capture of the peak analog value of the differentiated data signal as provided on line 290. The peak hold circuits 292, 294 are respectively enabled by the Gate A and Gate B signals, as provided on the Gate A and B control lines 72, 74 by the mircrocontroller 24. Under the control of the mircrocontroller 24, the peak hold circuits 292 and 294 are enabled for the respective durations of the A and B bursts. The resulting Peak A and Peak B analog signals are provided by the peak hold circuits 292, 294 on the Peak A and Peak B analog lines 84, 86 to the mircrocontroller 24. After conversion of the Peak A and Peak B analog signals, the mircrocontroller 24 may clear the peak hold circuits 292, 294 by temporarily shoring their outputs to ground in response to the operation of the A/B reset circuit 218 of the controller support circuit 30. Consequently, the analog peak value held by the peak hold circuits 292 and 294 will be reset to zero.

Referring now to FIG. 10a, an exemplary analog wave form as might be received from the pulse detector on analog output line 272 is shown. The particular section of the servo burst shown graphically illustrates an A/B burst. A portion of filler sync just prior to the A burst illustrates, by its peak variation, the occurrence of dropout. That is, as a result of variations in the raw analog data received by the pulse detector, the analog wave form may carry a fluctuation DC bias of sufficient magnitude that sync waveform peaks fail to surpass their intended minimum threshold values. A consequence of such an error is that the balanced network 282 will be improperly perturbed. This source of signal fluctuation may in turn lead to errors during the reading and of the A/B Bursts, as well as with respect to other fields including the address header and date fields. In accordance with the present invention, the capacitor 282 is introduced into the analog signal path at the analog output of the pulse detector 276 to effectively remove the DC bias and thereby suppress the occurrence of dropout.

FIG. 10b illustrates the same portion of the analog data stream as shown in FIG. 10a, but as DC filtered and present on the analog data line 284. The preferred embodiments of the present invention utilize extremely short A/B bursts in order to maximize the portion of the linear track length available for other purposes, specifically including the storage of data. Accordingly, the duration of the respective A and B burst fields is constrained to a nominal 4 microseconds as opposed to a more conventional 30 microseconds. A consequence of utilizing such a short A/B burst period is that a significant amount of baseline drift, arises as a result of the slew between the high amplitude filler sync signal and the much lesser amplitude of the A/B burst signal. By including a baseline drift perturbed portion of the burst signal within the Gate A and gate B enabled peak hold periods, false peak amplitude values, generally corresponding to the peak amplitudes indicated as $P_a$, $P_b$, will be captured by the peak hold circuits 292, 294 and ultimately received by the mircrocontroller 24. Since the A/B burst values are utilized to determine the relative position of the head with respect to the center line of the track, errors in measuring the A/B burst will directly correspond to an increased data error rate due to mispositioning of the heads relative to a track center line.

The differentiator 288 is provided in the preferred embodiments of the present invention to reduced, if not eliminate, the effect of baseline drift on the peak capture accuracy of the peak hold circuits 292, 294. The differentiator 288 is realized as an emitter follower configured bipolar transistor in the analog signal path between the analog line 284 and the analog line 290. A single pole high-pass filter is coupled to the emitter terminal of the emitter follower to implement the differentiator function. In the preferred embodiments, the filler sync and A/B signal frequency is approximately 2 megahertz. The differentiator high-pass pole is placed at about 9 megahertz to provide an adequate degree of differentiation of the A/B burst analog signals. The resultant signal provided to the inputs of the A/B burst peak hold circuits 292, 294 is shown in FIG. 10c. As shown, the peaks of each cycle of the respective A/B bursts are essentially constant as a direct consequence of the removal of any perturbing effect due to baseline drift.

Referring again to FIG. 9, the second principal read function performed by the data channel circuit 300 is to read data from the address header, data and ECC fields of data sectors. In response to the read gate signal as provided from the disk controller 112 via read gate control line 128, the data separator 260 begins providing separated data and its corresponding synchronized data clock signal to the ENDEC 251. To support this, the data separator 260 derives a voltage controlled oscillator (VCO) 262 with the error output of a phase lock loop synchronized to the digital raw data form line 278. The VCO output is fed back via line 266 to the data separator 260. The resultant data clock signal, effectively separated from the digital raw data and synchronized to the data being provided via line 252, is gated onto the data clock line 132. The ENDEC 251 receives the separated data and synchronized data clock signal and decodes the date to provide NRZ data to the disk controller 112 via the NRZ data line 130.

VIII. Seek Algorithm

Figure 11A:
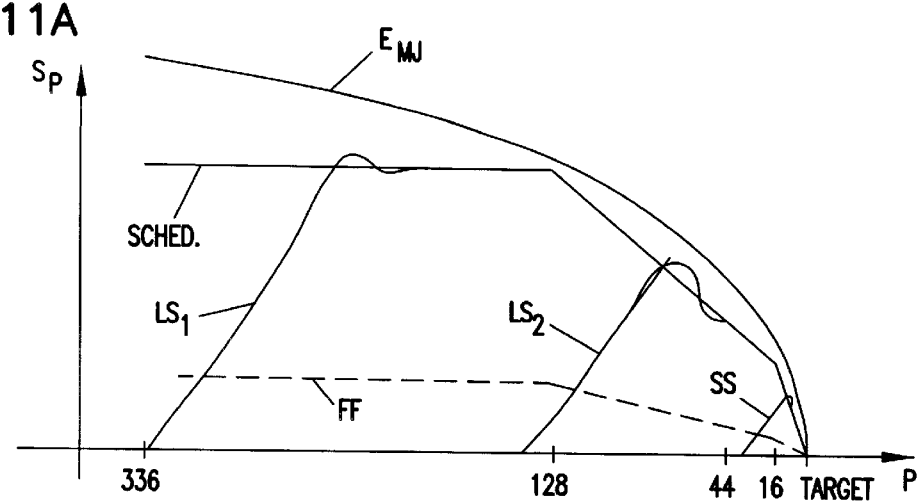
FIG. 11a is a diagram of position versus speed illustrating three separate actuator seek operators.

FIG. 11a depicts a speed versus position graphed profile of three exemplary seek operations illustrating the principles of the seek operation of the present invention. An envelope curve (ENV.) defines the maximum rate of deceleration achievable by the mechanical actuator assembly 16, 18, 20 that will achieve a zero radial speed of the head 20 at a target track T. The present invention provides for a succession of scheduled velocities that lie within the envelope for every given distance from the target track T. In the preferred embodiments of the presenting invention, the scheduled velocity is implemented as a three art linear approximation of the envelope curve, having a constant scheduled maximum speed for all distances greater than 128 tracks. A second portion of the scheduled velocity tracks a steadily decreasing maximum speed down to a distance of 16 tracks away from the target track T. The third and final part of the scheduled velocity curve extends at a still steeper scheduled decrease in speed down to a scheduled speed of zero at the target track T. Since the scheduled velocity never exceeds the envelope velocity scheduled velocity will tend to ideally maximize the portion of the seek operation where the heads 20 are moving at their highest speed toward the target track T, subject to being decelerated to arrive at the target track T without overshoot.

The seek operation, for preferred embodiments of the present invention, is realized as an iterative process described as follows:

---

Seek Algorithm $0 = K_{Sgain}(S_{schd} - (S_{ave} + S_{ff})) + I_t$  Eq. 1 where
O is the digital value output to the actuator DAC
$K_{Sgain}$ is a seek gain constant
$S_{schd}$ is the schedule velocity $$S_{ave} = \frac{S_a + S_f}{2}$$  Eq. 2 where
$S_a$ is the calculated actual velocity of the current sector
$S_f$ is the predicted velocity for the -continued Seek Algorithm

```
        next sector
    and
        S_f = S_a + kS_a                                    Eq. 3
        where
            vkv is a constant having
                a typical value of 0.5
            k > O for acceleration
            k < O for deceleration
            k = O for zero acceleration
    S_ff = K_Fgain(S_schd)                                  Eq. 4
        where
            K_Fgain is a feed forward gain constant
                having a typical value of 0.25
    I_t is an integrator target track band
        value determined from the track follow
        algorithm
```

Figure 11B:
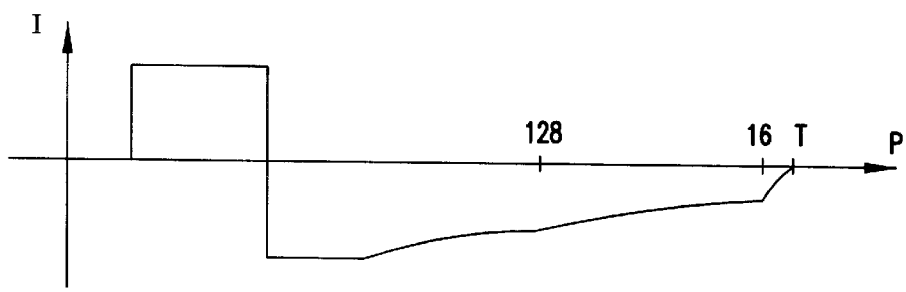

The actuator voice coil current versus position profile for a long seek ($LS_1$) operation is shown in FIG. 11b. On initiation of the seek, the gain select signal is provided to the actuator controller 32 to select the largest range of current values obtainable from the current driver 246. Initially, the calculated actual velocity $S_a$ is zero, resulting in a large actuator DAC output value O. Assuming that a positive actuator voice coil current moves the heads 20 in the direction of the target track T, a maximum current output is selected to maximally accelerate the heads 20 in the direction of the target track T. Maximum acceleration is maintained until the current velocity $S_{ave}$ plus a feed forward speed value $S_{ff}$ exceeds the current scheduled velocity. The current velocity is determined as the average of the last measured actual velocity $S_a$ of the heads 20 and the predicted velocity $S_f$ of the next velocity calculation. The control data for calculating the measured actual velocity is obtained by measuring the elapsed time between passage of a particular head 20 from one track to the next. The processing speed of the mircrocontroller 24 is sufficient to process servo bursts at even at maximum acceleration and velocity of the heads 20 across the tracks. Thus, both the grey code and A/B burst for every sect ore can be obtained and used to determine current position of the heads 20. By determining the elapsed time between passage over neighboring track-centers the actual velocity of the heads 20 can be determined. However, since the heads 20 are being accelerated and the computation to determine actual velocity occurs sometime after a servo burst is processed, a predicted next calculated velocity, $S_f$, is averaged with the calculated actual velocity, $S_a$. The result, $S_{ave}$, is therefore a close approximation to the current speed of the heads 20. As given by Equation 3, the predicted next calculated velocity $S_f$ is determined as a simple function of the last calculated actual velocity, $S_a$.

Due to the increasing acceleration of the heads 20, the current speed, $S_{AVE}$, plus the schedule dependent speed feed forward value, SFF, will rapidly approach and then exceed the scheduled velocity. Consequently, the actuator voice coil current, determined as the product of a conversion gain constant ($K_{Sgain}$) and the computed error velocity value, will reverse to a negative maximum current value until the head velocity is braked to that of approximately the scheduled velocity less the feed forward speed. The actuator output value, O, and the corresponding actuator voice coil current will then tend toward a zero current as the head speed equalizes with the scheduled speed. Again, the velocity of the heads 20 is repeatedly calculated, in accordance with the seek algorithm, from the time difference between passing over adjacent track-centers as determined by the continuous processing of the sector servo bursts.

At a distance from the target track T of 128 tracks, a value chosen for the preferred embodiments of the present invention to permit a close approximation of the velocity envelope, the scheduled velocity linearly decreases as a function of distance from the target track. Accordingly the actuator output value and voice coil current will be increased to increase braking of the head velocity to continue to equalize the speed of the heads 20 with the scheduled velocity. The feed forward speed value $S_{ff}$ is also proportionately reduced between tracks 128 and 16. At track 16, the scheduled velocity falls off at a greater rate resulting in a greater rate of head braking with an ultimate decrease of the actuator output value O and the voice coil current toward zero.

As described by Equation 1, the final actuator output value O and corresponding voice coil current at the target track T is not in fact zero. Rather the output value O is equal to an integrator constant $I_t$. Although the actuator assembly 16, 18, 20 is preferably a balanced arm unit, there are a number of unbalanced forces acting on the arm 18 and heads 20. These forces include windage and the non-zero, non-uniform servo loop force physically exerted by the head data lines 56 and actuator voice coil power lines 46. In accordance with the preferred embodiments of the present invention, a table of integrator values, $I_t$, is kept where each table entry corresponds to the actuator output value O corresponding to a voice coil current sufficient to maintain the heads 20 over a corresponding track within a respective band of tracks 22, as generally shown in FIG. 1. For the preferred embodiments of the present invention, each band of tracks 22 is composed of 64 consecutive tracks. While the respective table entry values of $I_t$ will vary, the preferred embodiments of the present invention in implementing the long seek algorithm utilize throughout the seek operation the table $I_t$ value corresponding to the target track band to which the target track T belongs. While such use of the integrator values $I_t$ is quit adequate, successive use of the integrator table $I_t$ values could be made as the heads 20 pass over the corresponding track-bands 22.

Figure 11C:
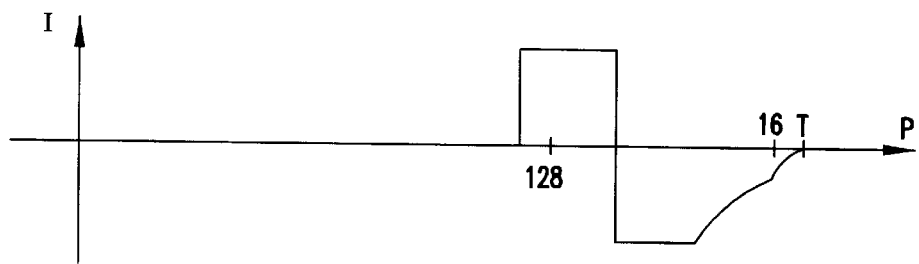
Figure 11D:
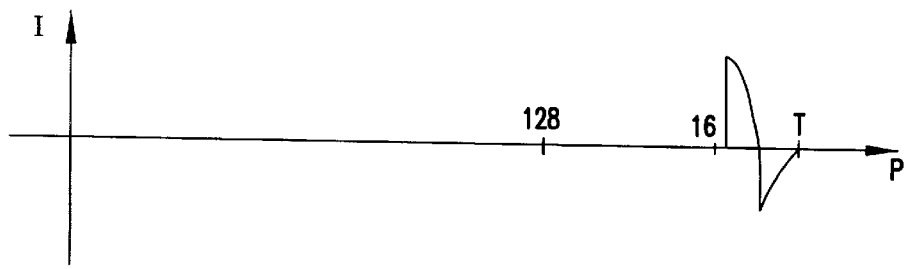

FIGS. 11c–d illustrate the voice coil current versus position profiles for a second long seek ($LS_2$) and a short seek (SS). The seek operation illustrated by FIG. 11c closely parallels that of the long seek operation illustrated in FIG. 11b with the exception that the position of the heads 20, at their velocity intersection with the scheduled velocity, is within the 16 to 128 track distance from the target T. Consequently, the initial velocity equilibrium established between the velocity schedule and the speed of the heads 20 is at a constant braking deceleration until just 16 tracks from the target tract T. The final deceleration curve to the target track T is then the same for both long seeks $LS_1$, $LS_2$.

FIG. 11d illustrates the actuator voice coil current versus position profile of a relatively short seek. For the preferred embodiments of the present invention, any seek operation for less than 45 tracks is considered a short seek. This arises from the fact that the acceleration curve for any seek of less than 45 tracks will result in a head sped intersection with a scheduled velocity within the last 16 tracks from the target track T. Consequently, still in full accordance with Equation 1, maximum acceleration is initiated and the mircrocontroller immediately begins to determine whether the scheduled velocity has sufficiently approached the rapidly decreasing scheduled velocity to begin breaking to then match the head speed with the scheduled velocity.

Finally, for seeks of less than 3 tracks, the algorithm described by Equation 1 is not used in preference to simply pulsing the actuator current to achieve head motion in the direction of the desired target track T.

IX. Track Follow Algorithm

The preferred embodiments of the present invention implement a closed loop servo operation to maintain the currently selected one of the heads 20 in alignment with a corresponding track at all times other than when seeking. Central to this operation is a track following algorithm, defined as follows:

---

Track Follow Algorithm

$O = K_{Tgain} (P_0 - j_x P_{-1}) + I_t$  Eq. 5
where
    $K_{Tgain}$ is a track follow gain constant
        where
            $K_{Tgain} = K_1$
                where ($vA_0v > vB_0v$ and $vA_0v > vA_{-1}v$)
                    or ($vA_0v < vB_0v$ and $vB_0v > vB_{-1}v$)
            $K_{Tgain} = K_2$
                where ($vA_0v \hat{} vB_0v$ and $vA_0v [\ ]vA_{-1}v$)
                    or ($vA_0v [\ ]vB_0v$ and $vB_0v [\ ]vB_{-1}v$)
    $P_0$ is the current off-track distance error
    $P_{-1}$ is the previous off-track distance error
        where the distance error $P_m$ is
            $P_n = v(A_n - B_n)v$  Eq. 6
        and
            $A_m$ is the A Burst peak value
            $B_m$ is the B Burst peak value
    $j_x$ is a constant
        where
            $0 < j_x < 1$
    $I_t$ is the integrator-current track-band value
        where the present value of $I_t$ is periodically updated as
            $I_{t1} = I_{t0} + m(A_{t0} - B_{t0})$  Eq. 7
            where m is a constant greater than 0

---

The track follow servo information is contained within the servo burst of each sector as detailed in FIG. 2c. As defined by Equation 5, the output value O utilized to specify the actuator voice coil current level is proportional to the sum of a position error value and the current track-band corresponding integrator table value $I_t$. The position error of ahead 20 with respect to the center line of a corresponding track is determined as the difference in the digital peak value of the A and B burst fields, as indicated by Equation 6. In accordance with the preferred embodiments of the present invention, a scaling factor $j_x$ is utilized to adjust the weight of the previous offtrack distance error, $P_{-1}$. The scaling factor $j_x$ must be less than equal to one and greater than or equal to zero in order for the close loop gain of the track followed servo to be stable. However, within this range, the value of $j_x$ may be chosen to approach one to yield a slow connection of the track following position of the heads 20 or, for $j_x$ approaching zero, a very fast correction based increasingly on the current off-track error position. In the preferred embodiments of the present invention $j_x$ is provided with a value of 0.75.

The position gain error factor $K_T$ gain is utilized in accordance with the present invention to significantly optimize the track follow servo operation. The value of the $K_{Tgain}$ factor is selected depending on whether the movement of the head 20 is currently toward or away from the center line of the track being followed. Where the head is moving away, the value of the $K_{Tgain}$ factor is increased to a value greater than one. A corresponding increase in the actuator output value O in the proper direction to reverse head movement back toward the center line of the track being followed is therefore achieved. Conversely, where the direction of movement of the head 20 is toward the center line of the track being followed, the gain factor $K_{Tgain}$ is reduced to unity or less to obtain a dampened approach of the head toward the center-line of the track and thereby minimize the likelihood of track center line overshoot.

As used in the seek algorithm, the integrator value $I_t$ is used to account for unbalanced forces acting on the actuator assembly 16, 18, 20. Accordingly, the integrator value $I_t$ is summed to the gain modified position error value to produce the final actuator output value O. However, the track-following algorithm, in accordance with the present invention, provides for the dynamic updating of the integrator values $I_t$. Whenever a particular track-band corresponding value $I_t$ is being used, it is updated during every sector period in the manner defined by Equation 7. A small fraction (preferably on the order of 0.1) of the current off-track error, defined by the current A/B burst difference, is summed with the current track-bank integrator value $I_{t0}$ to produce a new value $I_{t1}$ for subsequent use. While, in the preferred embodiments of the present invention, the dynamically updated integrator table values are not subsequently stored back to the default integrator table maintained in the EEPROM 144 (though they could), any difference from their default values will be quickly recovered following the instigation of track following.

X. Spin Motor Speed Control Algorithm

The present invention provides, in its preferred embodiments, for the "at speed" closed loop control over the rotational speed of the rotating media 12. In order to prevent any significant negative impact on the accurate reading and writing of data to the rotating media 12, commutation of the spin motor phase windings is selected to occur only during the intersector gaps. The three phase, three state commutation waveforms utilized in a preferred embodiment of the present invention are shown in FIG. 12. This preferred embodiment utilizes a 27 sector, and therefore 27 intersector gap, track format. The three shared nodes of the phase windings are driven by the spin motor controller 34 as being sourced current (plus), being a source of current (negative), or neutral (0).

FIG. 13 provides a timing control diagram illustrating the manner of speed control utilized in the preferred embodiments of the present invention. FIG. 13a is a simple line diagram showing the ideal timing of consecutive sector marks as they would occur during the revolution of the rotating media precisely at its ideal speed. The spin motor commutation is initiated for each sector during the immediately preceding intersector gap, prior to the dashed lines relating FIGS. 2b, 2c, 2d, and 2e and as generally indicated in the line diagram of FIG. 13b. Commutation of the spin motor 14, for example, at time $A_1$ is followed at $A_2$, with the initiation of a search by the mircrocontroller 24 for the anticipated occurrence of a sector mark. The mircrocontroller 24 establishes a maximum timed period beginning at $A_2$ and extending through $A_4$ for the search for the sector mark. Ideally, the sector mark occurs at $A_3$, the sector mark search is terminated and the spin commutation period for the current sector is calculated. The calculation of the spin commutation period is achieved through an application, in accordance with the present invention, of a spin algorithm defined as follows:

| Spin Algorithm |
| --- |
| $S_{cp} = k_{cp}((t_0 - t_{-1}) - t_{nom})) + I_{cp}$  Eq.8 <br> where <br>     $S_{cp}$ is the spin commutation period <br>     $k_{cp}$ is a spin gain constant <br>     $t_0$ is the current measured sector time <br>     $t_{-1}$ is the previously measured sector time <br>     $t_{nom}$ is a constant <br>     $I_{cp}$ is a spin integrator value <br>       where <br>         Ideal $S_{cp} = I_{cp}$  Eq. 9 <br> and where $I_{cp}$ is updated periodically as <br>     $I_{cp1} = I_{cp0} - i$ where $t_0 > t_{-1}$ <br>     $I_{cp1} = I_{cp0} + i$ where $t_0 < t_{-1}$ <br>     $I_{cp1} = I_{cp0}$     where $t_0 = t_{-1}$ <br>         where i is a small fraction of <br>         $I_{cp}$, preferably on the order of <br>         1/256 |

The object of the spin algorithm is to maintain a constant rotational speed by slightly altering the spin commutation period of the individual track sectors. An accurate determination of each sector period can be obtained by timing the occurrence of the sector marks with respect to the system clock.

As defined by Equation 8, the spin algorithm utilizes the net difference in the timed sector periods as an error value to adjust the spin commutation period. Any increase in the net sector period, less a nominal "at speed" time period of a sector for the rotating media 12 rotating at its proper speed, will yield a corresponding increase in the sector commutation period $S_{cp}$. Since the net increase in sector period corresponds to the rotating media 12 spinning at a speed below its intended value, the increased sector commutation period will have the desired effect of increasing the rotational speed of the rotating media 12. This set of circumstances is graphically illustrated in FIG. 13d where the sector mark actually occurs after a time $B_3$ equaling $t_0$ minus $t_{nom}$. Conversely, where the sector period error is negative, the spin commutation period, $S_{cp}$, is proportionately decreased leading to a corresponding decrease in the rotational speed of the rotating media 12. As shown in FIG. 13d, the early arrival of the sector mark prior to time $C_3$, corresponding to the rotating media 12 rotating at too high a speed, the net negative sector period error, as applied in Equation 8, reduces the spin commutation period to achieve a corresponding decrease in the rotational speed of the rotating media 12.

Since the value of $t_0$, $t_{-1}$ and $t_{nom}$ are time values, the spin gain constant $k_{cp}$ is utilized to convert the nominal sector spin period to the commutation timer value for the microprocessor 24. To account for deviations from ideal mechanical circumstances, such as due to losses caused by bearing friction, windage and other forces, a spin integrator value $I_{cp}$ is summed as shown in Equation 8. Depending on how well the current sector period tracks the nominal sector period, the spin integrator value previous in subsequent iterations of the spin algorithm is either incremented, decremented or left unchanged. By the selection of a small incrementer value "i", the spin integrator value $I_{cp}$ becomes and then remains a damped reflection of the dynamic spin speed losses.

An interesting effect achieved by the application of the spin algorithm defined by Equation 8is that the spin operation is self-compensating toward its nominal rotational speed, that is, where the rotational speed of the rotating media 12 is slowed by, for example, an impulse force, there will be an increased time period between the commutation of the motor 14 and the occurrence of the sector mark that causes a corresponding increase in the rotational speed of the rotating media. Conversely, an impulse force resulting in an increase in the speed of the rotating media 12 will cause a corresponding decrease in the speed of the rotating media 12. Both set of circumstances achieve results that are consistent with the sign of spin speed adjustment that would otherwise be required. Naturally, some spin speed adjustment will be applied, but of a magnitude reduced by the self compensating effect realize by the present invention.

In the preferred embodiments of the present invention, adequate control over the spinmotor speed is readily obtained by applying the spin algorithm only once per revolution of the rotating media 12. That is, the sector period values $t_0$ and $t_{-1}$ are taken as the sector period of a single sector during separate revelations of the rotating media. Similarly, the spin integrator value $I_{cp}$ is adjusted only once per revolution.

XI. Detailed Software Architecture

To support the real-time, event driven operation of the system controller 10, the software architecture of the present invention utilizes timed interrupts to manage the system controller process flow. Table I lists the principal interrupts utilized in the preferred embodiments of the present invention.

TABLE I

| INTERRUPTS | |
| --- | --- |
| T5 | New Sector Background Process |
| T4 | Actuator Background Process |
| T1 | Mid-Sector Spin Control Process |
| T0 | Sector Period Time-out |
| Reset | Full System Reinitialize |
| IRQ | Full Interface Initialize |
| SWI | Breakpoint, Return to Diagnostics |

Timed interrupts T5, T4, T1, T0 are generated by the TIO 162 with the mircrocontroller 24. A reset interrupt is asserted in response to initial power-on operation. An interrupt request (IRQ) is invoked in response to a hardware supplied signal from the external host to request a full hardware and software interface initialization. The final principal interrupt is a software interrupt that, when executed as a mircrocontroller instruction, effectively and conveniently returns execution control to the embedded diagnostic monitor routine of the present invention.

A) Diagnostic Monitor and Interface Process

Figure 14:
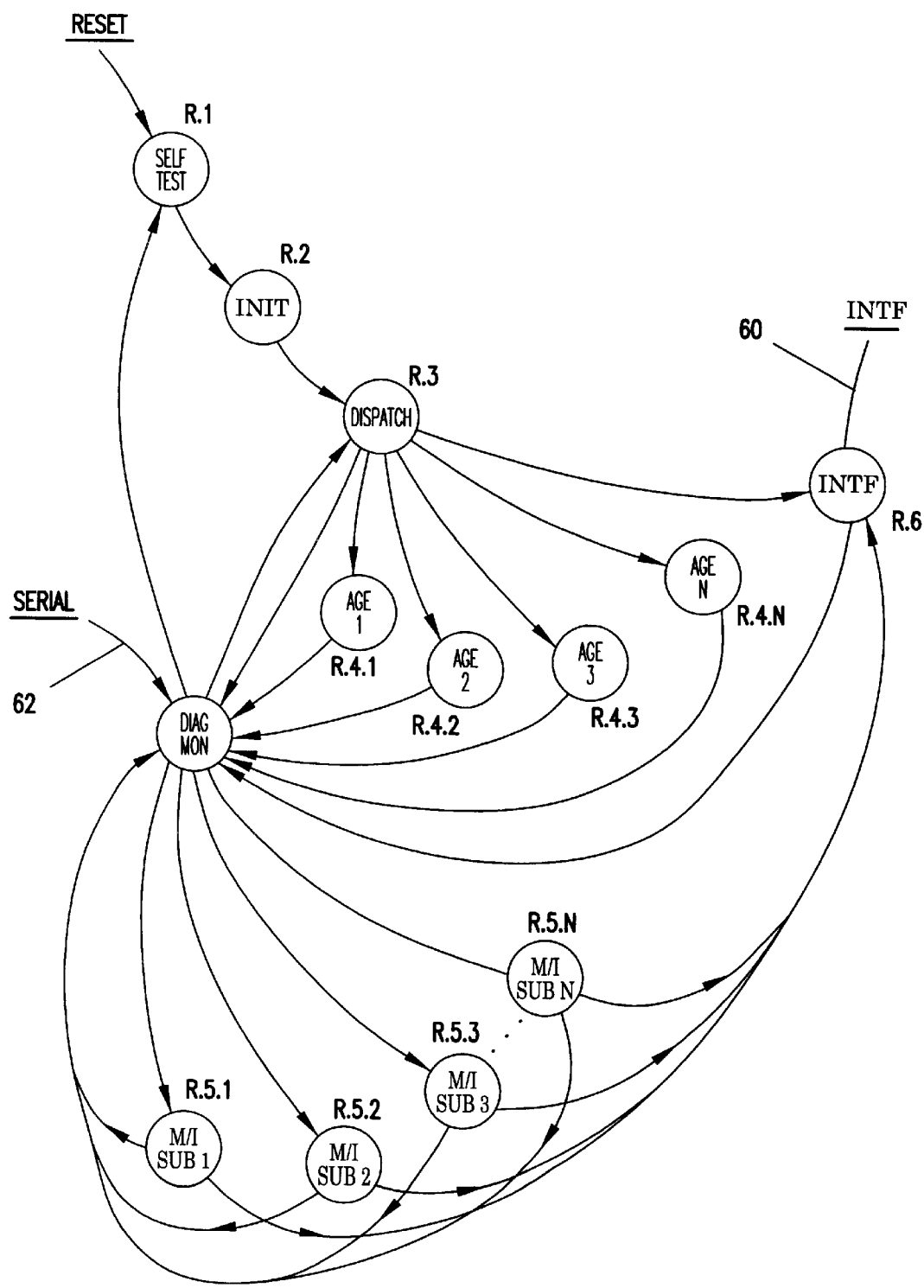
FIG. 14 is a software state diagram illustrating the reset process flow, including the interface and diagnostic monitor task, in accordance with a preferred embodiment of the present invention.

As illustrated in FIG. 14, a system controller self-test subprocess R.1 is performed in response to a hardware reset interrupt or an unconditional branch to the initial instruction location of the self-test routine R.1 by the mircrocontroller 24. The self-test routine R.1 preferably performs a conventional data integrity check of its on-board RAM 142, EEPROM 146 and control memory ROM 26. Execution then passes to an initialization routine R.2, wherein the programmable components of the system controller 10 are initialized by the mircrocontroller 24 utilizing initialization data obtained from the ROM 26. In addition, some data stored within the EEPROM 146, including principally the integrator table value $I_t$ and integrator value $I_{cp}$ are transferred to predefined integrator value locations within the RAM 142 of the mircrocontroller 24 Other variables having initial or default values are also stored to predefined locations within the RAM 142 from the ROM 26.

With the system controller 10 thus initialized, a reset dispatch routine R.3 is then executed. Table II identifies four state variables that are relied on throughout the operation of the mircrocontroller 24 to establish and maintain continuity between the various microprocessor task functions being performed, all in real time.

TABLE II

STATE VARIABLES

Spin State Control
Actuator State Control
Read/Write State Control
Age State Control The spin state, actuator state and read/write state control variables are preferably initialized by the mircrocontroller 24 to a state value, commonly zero, corresponding to an initialization state and stored in the RAM 142. The age state control variable is kept as a data value stored in a predefined location within the EEPROM 146. The dispatch routine R.3 utilizes the current value stored in the age state control variable as a pointer for determining which of the subroutines R.4.1, R.4.2, R.4.3, . . . , R.4.n, to next execute. Table III identifies the preferred function performed by each of the age subroutines R.4.x.

TABLE III

Age Routine Functions

| | |
|---|---|
| Test 0 - | Start monitor |
| Test 1 - | Format, read write |
| Test 2 - | Tracking error test |
| Test 3 - | Start/stop test |
| Test 4 - | Random seek and read |
| Test 5 - | Reformat |
| Test 6 - | Identify bad sectors |
| Test 8 - | Random seek/write/read |
| Test 10 - | Calibrate servo gain |
| Test 19 - | Save $I_t$, $k_x$, etc values to EEPROM |
| Test 20 - | Random full retries |
| Test 21 - | Initiate interface routine |
| Test 22 - | Start/stop spin motor |
| Test 23 - | Life exercise test |

Normally, the age state control variable stored by the EEPROM 146 is incremented to the next successive test age state control value on successful completion of the current age test. The incremented value is written back to the EEPROM 146. For a good working system controller and associated disk drive, the age state control variable is finally written to the EEPROM 146 with a value corresponding to the interface routine R.6. The interface routine R.6 is thereafter responsive to commands and data placed to the system controller 10 via the command/data bus 60.

Completion of each of the individual age tests, or the occurrence of an exception condition during a test will cause the execution of the diagnostic monitor routine R.5. An error flag data variable maintained in the RAM 142 is utilized to determine whether successful age test completion will result in the updating of the EEPROM age state control variable and the passage of execution back to the dispatch routine R.3 for the continuous looping and successive execution of the age test. Table IV identifies the principle variables and buffers used in the diagnostic monitor routine R.5.

TABLE IV

DIAGNOSTIC/MONITOR INTERFACE

Input Buffer
User Command Value
Command Parameters
Display Buffer
Current Age Test No.
Error Flag
Loop Flag Preferably, the occurrence of any exception condition will result in the diagnostic monitor routine R.5 not updating the EEPROM age state control variable nor the immediate passage of execution to the dispatch routine R.3. Instead, in the preferred embodiments of the present invention, the diagnostic monitor routine R.5 will communicate the occurrence of the exception condition to, typically, a conventional dumb terminal attached to the serial port 62 of the microcontroller 24. Preferably, the diagnostic monitor routine R.5 permits an end-user, communicating by way of the serial port 62, to view and alter the state of all data present within the RAM 142, the EEPROM 146, the control program stored in the ROM 128, all of the readable programmable registers of the various on-chip peripherals, the grey code shift register of the controller support circuit 30 and the read/write controller 112, and finally, the RAM 110. In additional, the diagnostic monitor routine R.5 permits testing programs to be downloaded, via the serial port 62 to the RAM 110 and then executed. This permits the system controller 10 to exercise and gather analysis data on itself. Consequently, all aspects of the system controller 10 are available for inquiry via the serial port 62 and diagnostic monitor routine R.5.

In accordance with the preferred embodiments of the present invention and due to the centralized execution of the principal aspects of all processes within the system controller 10, the occurrence of most any exception or fault condition is by detection of the microcontroller 24. Therefore, the occurrence of an exception condition in real time can be identified and the status and control data values relevant to a causal understanding of the error can be immediately displayed or stored to the RAM 142 for subsequent review. This is of particular advantage where the status and control data values change dynamically (rapid and erratic) or where the exception condition only sporadically occurs. The internalized storage of the status data at the real time occurrence of the error by the system controller 10 permits subsequent display of the details of the error where display, in real time, of changing error data would be too rapid and brief or, at the other extreme, too infrequently for detection and analysis.

In addition, the diagnostic monitor routine R.5 may be directed to continuously provide a display of normal operating status data in addition to real time exception condition data. This allows confirmation of the proper operation of the system controller 10 as well as the visual checking of error data patterns as may result from recurring errors by continuous display of data again in real-time via the serial port 62.

Certain of the normal operating and exception condition status and data values will, in accordance with the preferred embodiments of the present invention, be stored into corresponding predetermined locations within the EEPROM 146 during the early age tests. These data values then become the initialization data values, obtained by the initialization routine R.2, to optimally configure each system controller 10 for the particular electromechanical and media surface characteristics of its associated disk drive. Specifically, the data values determined through the execution of the age tests most notably include the integrator values, $I_t$ of the integrator table used to store the target band integrator values, the integrator value $I_{cp}$ used in the spin algorithm and the various gain constants used in the seek, track follow and spin algorithms.

The diagnostic monitor routine R.5 is used as an entry point for collecting all of the commonly utilized subroutines required in performance of the age tests and the interface routine R.6. These subroutines are shown as subroutines R.5.1, R.5.2, R.5.3, . . . , R.5.n. As shown for the interface routine R.6, common subroutine functions required in performance of the interface task are accessed through the diagnostic monitor routine R.5 to initiate the execution of a corresponding subroutine R.5.x. This architecture allows the diagnostic monitor routine R.5 to monitor, in real-time detail, the execution of the age tests R.4.x as well as the ongoing operation of the interface routine R.6. On the execution completion of any of the subroutines R.5.x a Return From Subroutine instruction is executed allowing execution control to be returned to the original calling routine, such as the diagnostic monitor routine R.5 and interface routine R.6 as shown and the individual age test routines R.4.x (paths not shown).

The foreground task performed in accordance with the present invention is, therefore, essentially two separate processes. The process centered on the diagnostic monitor routine R.5 is realized without any significant degradation of the processing performance of the microcontroller 24 in performing the required interface process supported by the interface routine R.6. This is achieved through the evident high degree of integration of the diagnostic monitor routine R.5 with the interface routine R.6 to realize the foreground task as a cohesive operation.

Considering the interface routine R.6 itself, Tables V and VI describe the principle command data fields placed by the interface controller 28 in the RAM 110 in response to a host command.

TABLE V

INTERFACE CONTROL VARIABLES (SCSI)

Target Priority
Target I.D.
Initiation I.D.
SCSI Command Description Block
SCSI Request Block
Requested Data Length
Initiator Starting Block Address
Reserve Target I.D.
Reserving Initiator I.D.
Arbitration Time Value
Initiator Attention Flag

TABLE VI

INTERFACE CONTROL VARIABLES (RAW)

Operation Request
Cylinder Request
Head Request
Sector Request

The interface control variables listed in Table V correspond to the ordinary SCSI common core protocol variables. The interface control variables listed in Table VI comprise the much simpler information that is obtainable by the interface controller 28 as a command from the peripheral data and control bus of a conventional "AT" personal computer. That is, the interface 28 controller is presented with a minimum set of information merely identifying the physical cylinder, head and sector for which a data operation is to be performed and an operation request indicating the nature of the request, such as to perform a sector read, write or format. Absent other activity, the interface routine R.6 watches for a command to become available in the RAM 110, then accesses the command via the disk controller 112. The interface routine R.6 then performs the succession of operations necessary to support the disk controller 112 as necessary to actually perform the command. This activity actually entails, excepting the support of the interface controller 28 in the performance of SCSI messaging protocols, largely writing an appropriate value to the actuator and read/write state control variables in the RAM 142, providing successive cylinder, head and sector identification data to the disk controller 112 and performing comparisons of current track and sector values against target values in respective predefined variable storage locations, also in the RAM 142. The occurrence of the timed interrupts initiating the background tasks of the present invention will subsequently cause the interface "message", consisting of the new values provided in the actuator and read/write state control and data variable locations, to be recognized and performed.

Figure 15:
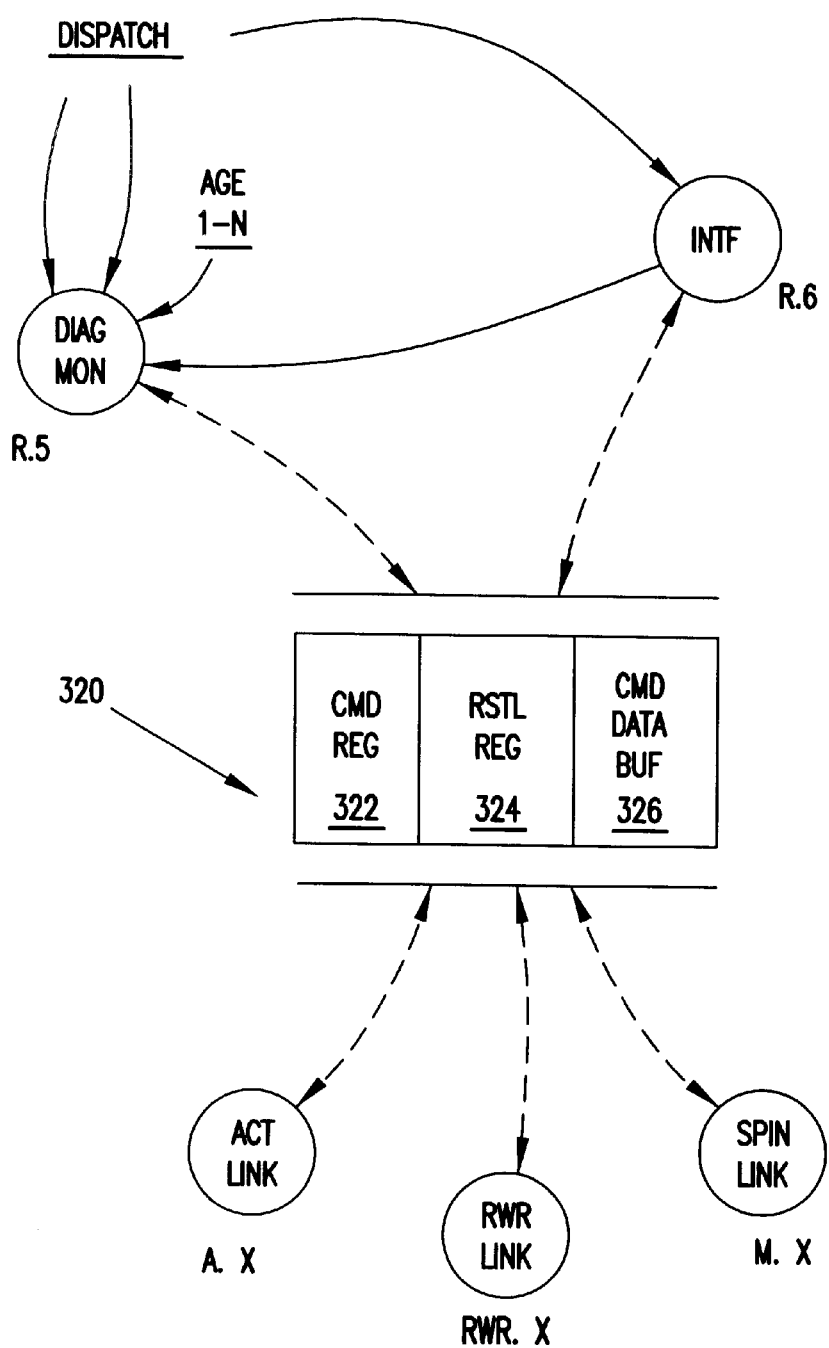
FIG. 15 is a software transition diagram illustrating an enhanced data exchange structure for exchanging data between a foreground interface and diagnostic monitor task and a number of background tasks as implemented in a preferred embodiment of the present invention.

An alternate software interface between the diagnostic monitor and interface routines R.5, R.6, and the background actuator read/write and spin motor tasks, A.x, RWR.x, M.x, is shown in FIG. 15. Rather than directly altering the state control variables and other related operating data variables directly utilized by the background tasks, a command buffer 320 is established in the RAM 142, or alternately, the RAM 110. The command buffer 320 preferably includes a command register 322 containing the initial state control variables required to initiate the execution of a command by the background tasks, a result register 324 providing for the storage of completion status values, and a command data buffer 326 for temporarily buffering any command specific data, such as target track and sector values, provided along with the command. Thus, any ongoing operations being performed by the background actuator, read/write, and spin motor tasks are not disturbed by the receipt and initial management of a host command by the microcontroller in executing the interface routine R.6.

B. Sector Task

Figure 16:
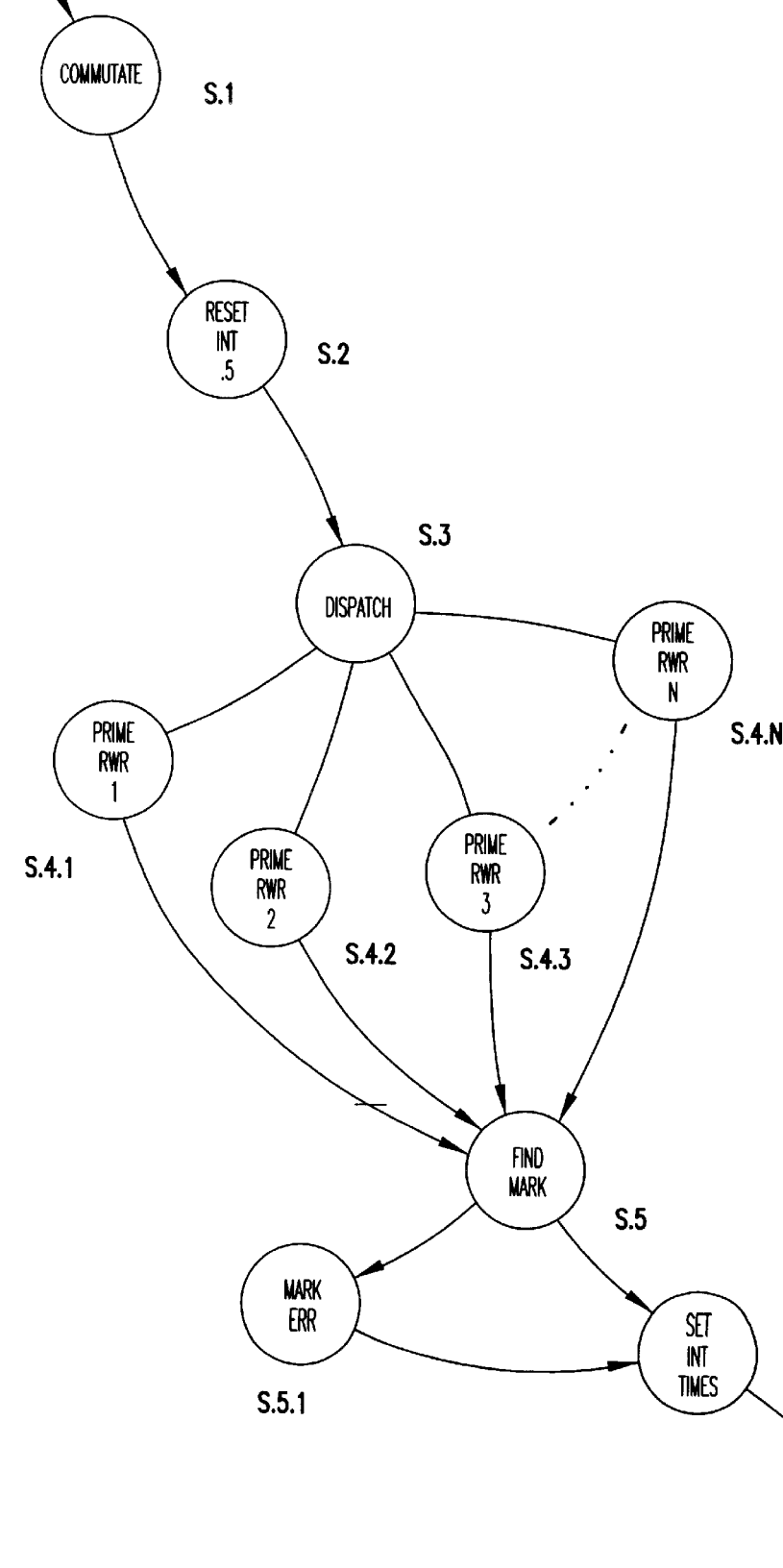
FIG. 16 is a software transition diagram illustrating the process control flow of a sector background task.

The new sector task occurs in response to interrupt 5, generated in response to the expiration of the T5 count value. As generally shown in FIG. 2e, the sector task is composed of successive spin motor, read/write, actuator and second spin motor subprocess. The detailed software architecture of the sector task is shown in FIG. 16. On receipt of the T5 generated interrupt, the microcontroller 24 immediately executes a spin motor commutation routine to provide a previously prepared phase winding select value to the phase latch 210 of the controller support circuit 30. The T5 counter is then reset, as indicated, by the execution of routine S.2. The microcontroller 24 then executes a read/write error check and dispatch routine S.3. Where a read/write task was in progress with respect to the prior sector, as determined by the sector task for current sector, the sector disk must quickly determine whether a read/write, spin or off-track error occurred during the operation. Spin and off-track error flags are posted during the prior sector period. A read or write error will be detected by the disk controller 112 and signalled by a register flag. If one of these errors did occur, the microcontroller 24 must suspend the read/write process, pending correction of an off-track or spin error, and then restart the read/write process with a retry of the sector operation that failed due the occurrence of the error. The microcontroller 24 initiates a recovery procedure by altering the control state variable value for not only the read/write task, but also the spin and actuator tasks if appropriate. Then, based on the value now stored in the read/write state control variable, one of the read/write task initialization routines S.4.1, S.4.2, S.4.3, . . . , S.4.n is selected by storing its address in a read/write chain to address storage location in the RAM 110. The functions of the principle initialization routines are listed in Table VII.

TABLE VII

| READ/WRITE STATES |
| --- |
| 0 initialize AIC-010 |
| 1 read/write ready |
| 3 abnormal end of read/write |
| 4 format first sector |
| 5 format next sector |
| 6 format last sector |
| 7 start sector write |
| 8 write sector |
| 9 retry sector write |
| 10 last sector write finish |
| 11 start read sector |
| 12 restart read sector |
| 13 read, start data transfer |
| 14 read, continue data transfer |
| 15 stop read, continue data transfer |
| 16 stop read, stop data transfer |

On completion of the selected one of the task initialization routines S.4.x, a "next-execution" or chaining address is stored to a predefined address storage location in the RAM 142. This chaining address will be subsequently used to identify a specific read/write subtask for later execution. The read/write initialization routines S.4.x, after saving the chaining address, terminate by transferring control of program execution to the find sector mark routine S.5. This routine initiates the sector mark search by continuously polling the state of the sector mark line 78. After a predetermined period of time spent waiting for the sector mark, a mark error routine S.5.1 will be executed to post an error flag and save the error-related status data. In addition, the mark error routine S.5.1 will change the spin state control variable value to effect a request for an error spin-down of the spin motor 14.

If, however, a sector mark is found during the execution of routine S.5, an interrupt timer initialization routine S.6 is then immediately executed. This routine S.6 provides for the restarting of the timers T5, T4, T1, T0 for the current sector period. In particular, the value assigned to the T5 timer is that value determined by the spin motor algorithm. The T0 value is chosen to be the longest sector period time allowable within the tolerances of the system controller 10. The T4 and T1 time delays are selected as one-eighth and approximately one-half, respectively, of the current sector period. Thus, the sector task initializes all of the background tasks for execution during the current sector period as well as initializing itself with respect to the next sector. The sector task then concludes with the execution of a Return From Interrupt instruction.

C. Actuator Task

Figure 17:
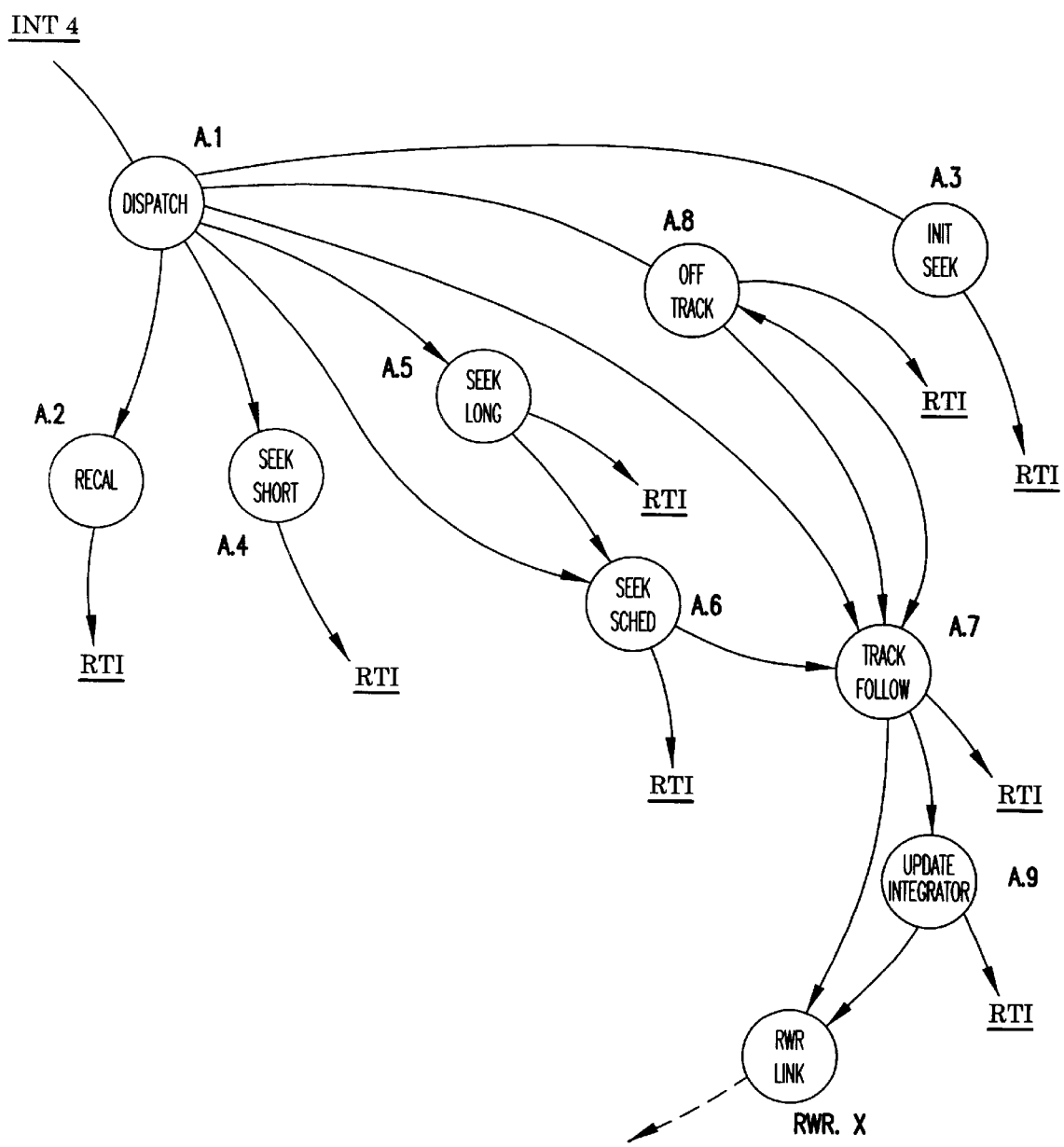
FIG. 17 is a software transition diagram illustrating the process control flow of an actuator control background task.
Figure 18:
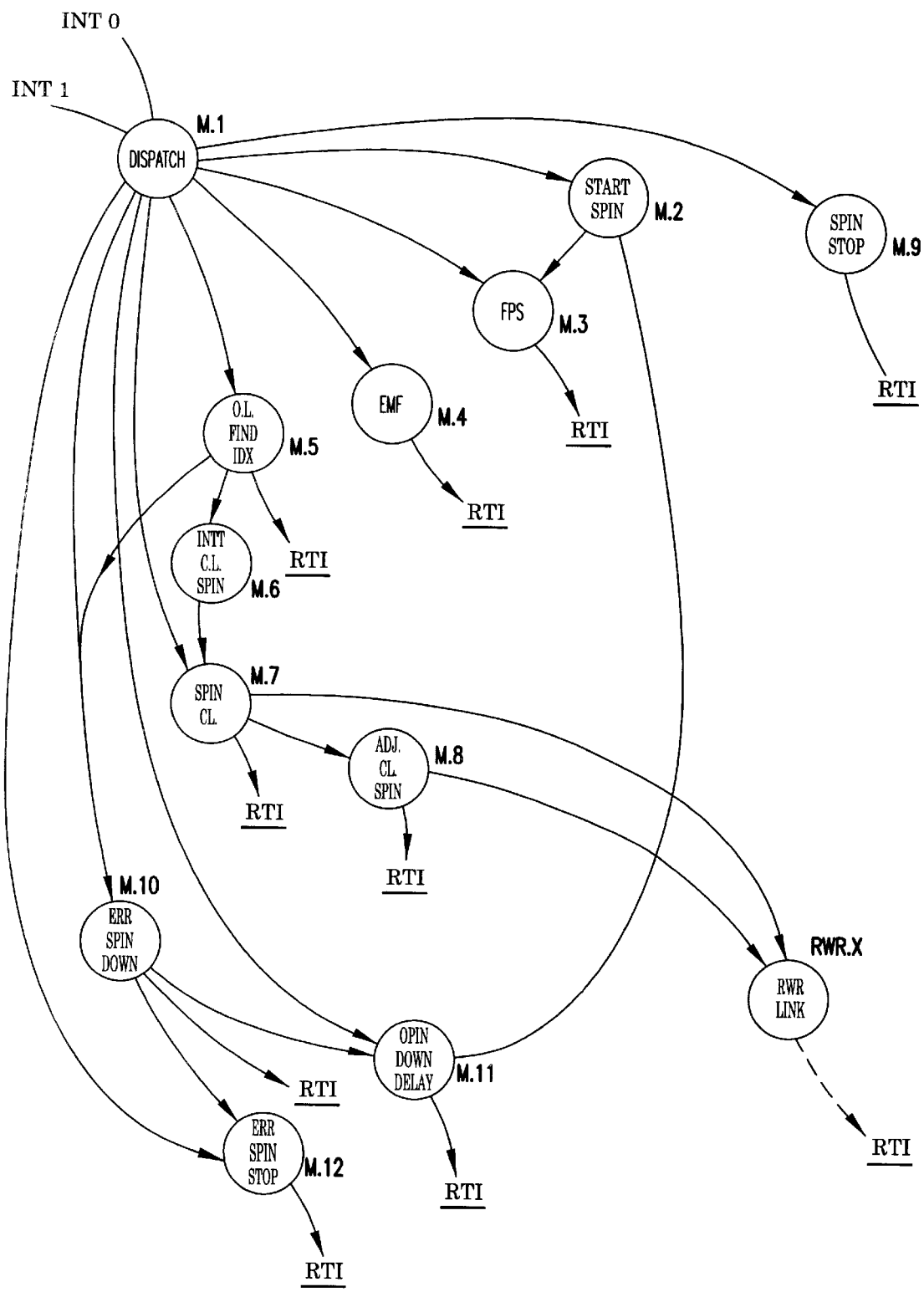
FIG. 18 is a software transition diagram illustrating the process control flow of a spin motor speed control background task.

In response to interrupt 4, generated on expiration of the timer T4 count value, an actuator dispatch routine A.1 is executed, as generally shown in FIG. 17. The dispatch routine A.1 utilizes the actuator state control variable value to select one of a number of state operation routines to perform. These state routines are identified by function in Table VIII.

TABLE VIII

| ACTUATOR CONTROL STATES |
| --- |
| 0 Recal to I.D. Crash Stop |
| 1 Seek NOP |
| 2 Initiate Seek |
| 3 Short Seek (~2 Tracks) |
| 4 Long Seek: Initialize |
| 5 Long Seek: Accelerate to Schedule |
| 6 Long Seek: Follow Schedule |
| 9 Actuator Track Follow |
| 10 Seek and Track Follow Error, Retry |

There are basically three types of actuator state operations. These types include initialization, seeking and track following. An initialization routine A.2 directs a recalibration of the actuator by moving the actuator to track 0.

The seeking operations are initiated by the execution of a seek initialization routine A.3. This routine A.3 operates to determine the direction and length, if any, of a seek. If already present on the requested track, the actuator state control variable value is set to next select the track following routine A.7 by the way of dispatch routine A.1. If a seek is in fact required, a determination is made as to whether it is a short seek, within plus or minus two tracks, or a long seek. The actuator state control variable value is then set to have the dispatch routine A.1 next select either the short seek or long seek routine A.4, A.5, as appropriate. In either case, the seek initialization routine completes by the execution of a Return from Interrupt instruction. As should be evident, the seek operations each typically require multiple sector periods to complete.

The short seek routine A.4, when invoked from the dispatch routine A.1, initially pulses the actuator to obtain movement in the direction of the target track and thereby initiates the seek, waits over perhaps several sectors to move the one or two tracks, and then sets the actuator control state variable value to select the track follow routine A.7 before its final execution of a Return from Interrupt instruction.

The long seek routine A.5, implementing the seek algorithm of the present invention, initially sets the actuator for maximum acceleration in the direction of the target track T, waits for a duration of multiple sectors until the velocity of the heads 20 begins to closely approach that of the seek schedule. The actuator state control variable value is then altered to select the seek schedule routine A.6 before its final termination with a Return from Interrupt instruction.

The seek schedule routine A.6 implements the actuator seek algorithm for following the scheduled velocity until the heads 20 are within a fraction of a track width (preferably less than 50 percent of a track width) of the target track center line. The actuator state control variable value is then changed to select the track following routine A.7 before the seek schedule routine A.6 terminates with a Return from Interrupt instruction.

The track follow routine A.7 implements the track follow algorithm of the present invention. Thus, once per sector, an adjustment is made to the position or change in position of the heads 20 relative to the center line of the current track. The variables used in the execution of seek and the track-follow algorithms are identified in Table IX.

TABLE IX

ACTUATOR CONTROL VARIABLES

Current Off-track Position
DAC Output Value
Current Grey Code Cylinder Value
Distance to Target Track
Seek Direction
Expected Seek Grey Code
Actuator Velocity
Predicted Velocity
Actuator Gain Control Value
Grey Code Error Flag
Seek Error Counter
Short Seek Flag
RAM Integrator Table If there is no read/write operation pending, as determined from the read/write state control variable value, each sector execution of the track following routine A.7 will typically complete by the execution of a Return from Interrupt instruction. Periodically, termination of the track following routine A.7 will instead invoke the integrator update routine A.9. This routine A.9 adjusts the integrator value $I_t$ for the present track-band 22 based on the updated value provided by the track follow algorithm. The modified value of the integrator $I_t$ is then available for use in subsequent track following calculations, at least until it is again updated. The integrator update routine A.9 may then terminate by the execution of a Return from Interrupt instruction or, as with the track-follow routine A.7, if there is a pending read/write operation, program execution control will be passed to the read/write routine RWR.x based on the chain address set up by the read/write task initialization routine executed during the performance of the sector task.

D. Spin Motor Speed Control Task

The occurrence of an interrupt in response to either the T1 or T0 timer count expiration, will involve the spin motor task dispatch routine M.1. The only difference, in the preferred embodiments of the present invention, between the occurrence of the T0 interrupt as opposed to the T1 interrupt is that the spin state control variable value will be forced to an error spin down state corresponding value following a T0 interrupt. The spin control states are listed in Table X.

TABLE X

SPIN CONTROL STATES

0 No Spin Control
1 Set Full Spin Power
2 Diagnostic Test Motor Coils
3 Spin-up Using Full Position Sensor
6 Measure Spindle Coil Current
7 Spin-up Using EMF Current Feedback
8 Spin-up Using Sector Marks
9 "At Speed" Closed Loop Spindle
    Speed Control
12 Spin-up Error Reset and Retry
13 Set Spin-down Delay
14 Spin Stop The spin motor task performs essentially four primary functions. These functions include bringing the spin motor and rotating media 12 up to a predetermined rotational velocity, precisely maintaining the spin velocity of the rotating media 12, stopping the spin motor 14 and handling spin motor speed errors. For the first function, the dispatch routine M.1 will have a spin state control variable value selecting the start spin routine M.2. The start spin routine M.2 provides for the initialization of the spin motor spin-up process as described in detail in the above-identified Application METHOD AND APPARATUS FOR BRUSHLESS DC MOTOR SPEED CONTROL. In brief, this procedure involves a full position sense (F.P.S.) operation for initiating the proper directional rotation of the rotating media 12 up to approximately twenty percent of the spin motor's final speed. The start spin routine M.2, on completing initialization, sets the spin state control variable value to select the the full position sense routine M.3. Until the twenty percent spin velocity is reached, the full position sense routine M.3 continues to be executed periodically, based on a default sector period time. Once the twenty percent speed level is achieved, the full position sense routine M.3 changes the spin state control variable value to select the EMF sense routine M.4. The EMF sense routine M.4 utilizes a back EMF sensing procedure to continue the acceleration of the spin motor toward its final rotational speed. Once the final speed is very nearly achieved, the EMF routine M.4 sets the spin state control variable to select an open loop/find mark routine M.5. This routine M.5 begins a search for an identifiable sector mark on the rotating media. In preferred embodiments of the present invention, the total search period extends over the expected length of approximately four full sectors. On failure to find any recognizable sector mark, the open loop/find mark routine M.5 will set the spin state control variable to select the error spin down routine M.10. However, on properly finding a proper sector mark, the open loop/find mark routine M.5 invokes a short, initialize closed loop spin routine M.6 that then chains to a spin closed loop routine M.7. This latter routine M.7 implements the full, "at speed" spin algorithm for controlling the rotational speed of the rotating media 12. The principal variables used in the execution of the spin algorithm are listed in Table XI.

TABLE XI

SPIN CONTROL VARIABLES

Spin Duty Cycle
Spin Reference Time
Spin Speed Error
Maximum Current
Motor Position Current
Time Out Counter
Spin Up Retry Counter
Previous Sector Time In the preferred embodiments of the present invention, the spin closed loop routine M.7 invokes an adjust closed loop spin routine M.8 once per track revolution. This adjust spin routine M.8 provides for the adjustment of the spin commutation period and spin commutation integrator value $I_{cp}$ in accordance with the spin motor algorithm. In any case, the spin closed loop and adjust closed loop spin routines M.7, M.8 will either terminate by the execution of a Return from Interrupt instruction or, where there is a pending read/write operation, by chaining to the chaining address identified read/write routine RWR.x selected during the execution of the sector task.

It should be noted that, in accordance with the preferred embodiments of the present invention, the closed loop spin routine M.7 does not, in fact, perform the commutation of the spin motor 14. Rather, the function of the spin closed loop routine M.7 is to establish the next phase winding select value and T5 value (spin motor duty cycle) that will be stored to the phase latch 210 of the controller support circuit 30 and provided to the T5 TIO counter during the execution of the sector task.

If the error spin down routine M.10 is selected by the dispatch routine M.1, the motor controller 34 is disabled and the commutation of the spin motor 14 is halted to allow the spin motor to slow down. To wait while the spin motor slows, the error spin down routine M.10 sets the spin state control variable value to select the spin down delay routine M.11 or, if a number of spin speed related errors arbitrarily defined as excessive (typically two) have occurred, the error spin stop routine M.12. Assuming that a restart is appropriate, the spin down delay routine M.11 will wait until it determines that an adequate period of time has passed to allow the rotating media 12 to stop before initiating the restart of the spin motor 14. The restart is initiated by setting down the spin state control variable to next select the start spin routine M.2.

The error spin stop routine M.12 and the normal power off spin stop routine M.9 operate similarly in that they terminate the commutation of the spin motor 14. These routines M.9 and M.12, thereafter, perform a null function essentially by simply executing a Return from Interrupt instruction. The only difference between these two routines M.9, M.12, is that error spin stop routine M.12 saves the error related status data for use by the diagnostic monitor routine R.5 on each initial selection of the routine for execution.

E. Read/Write Task

Figure 19:
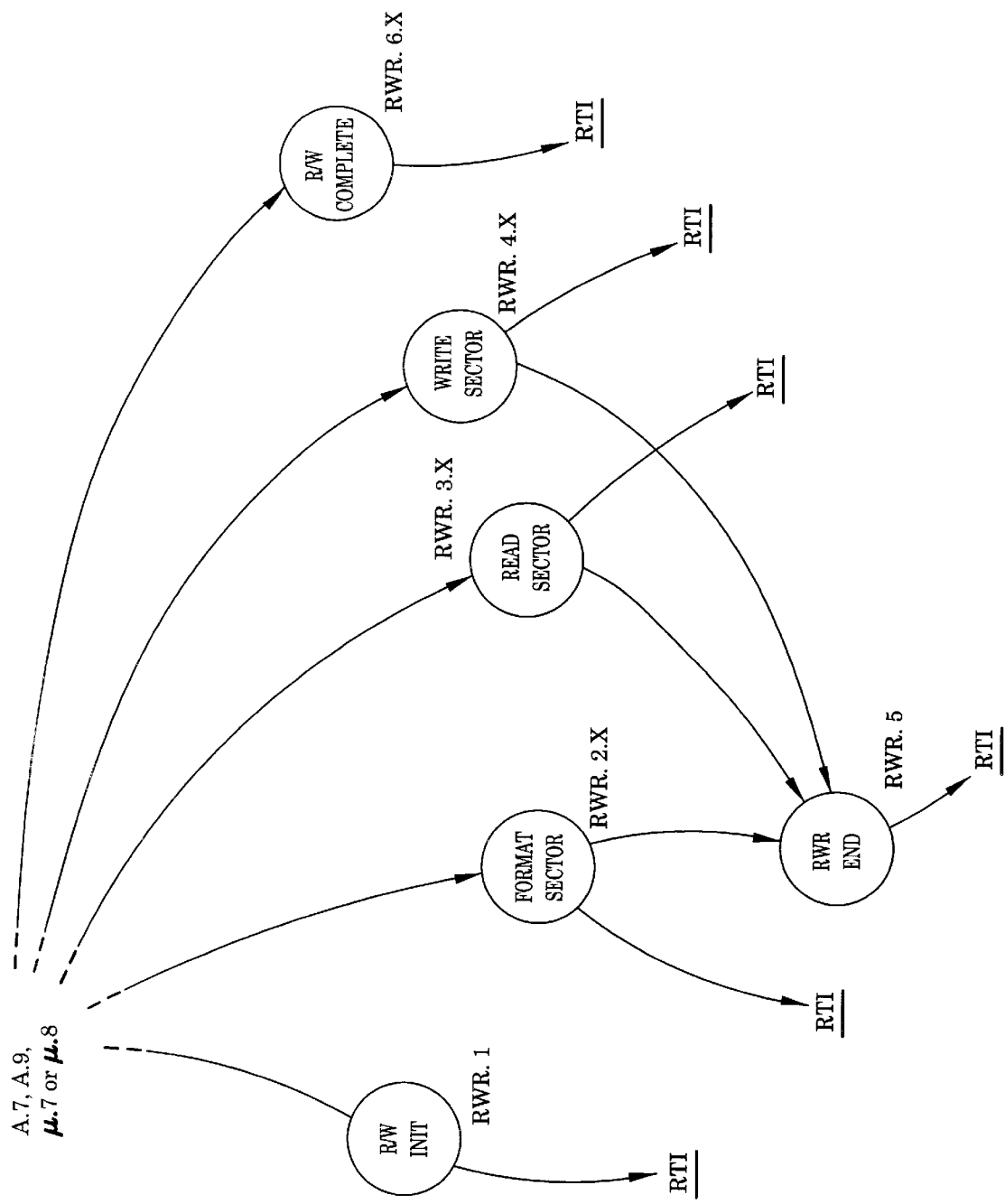
FIG. 19 is a software transition diagram illustrating the process control flow of a read/write background task.

The control flow of the read/write task is generally shown in FIG. 19. In the preferred embodiments of the present invention, the routines RWR.1, RWR.2.x, RWR.3.x, RWR.4.x, RWR.6.x of the read/write task are directly chained to on completion of either the actuator or spin motor task. The specific read/write routine chained to is determined during the sector task. Therefore, the execution overhead required for selecting a specific read/write routine is moved to its subtask position within the sector task to facilitate read/write error handling and to maximize the available time following completion of either the actuator or spin motor task to perform the necessary read/write operations.

The basic operations performed are initialization, formatting, sector reading and sector writing as respectively provided for by the routines RWR.1.x, RWR.2.x, RWR.3.x, and RWR.4.x. The basic operations of the format, read and write functions are implemented by programming a corresponding operation to be performed by the disk controller 112. The principal variables used in the read/write task routines are listed in Table XII.

TABLE XII

READ/WRITE CONTROL VARIABLES

Current Cylinder
Current Selected Head
Current Sector Position
Target Cylinder
Target Head
Target Sector
No. Sectors to Read/Write On completion of respective format, read and write operations, a read/write end routine RWR.5 is executed to confirm and post the status of a successful completion of an operation or, if an exception condition exists as a result of the operation, to save the status data relevant to the error condition and flag the operation as having failed. Finally, a read/write complete routine RWR.6 is invoked on successful completion of any operation.

XII. Summary

Thus, a highly efficient software control architecture for the real time control and management of a rotating media type data storage peripheral, through the use of temporal scheduling of control tasks, has been described.

Clearly, many modifications and variations of the present invention are possible in light of the above teachings. Therefore, it is to be understood, that within the scope of the appended claims, the principles of the present invention may be realized in embodiments other than as specifically described herein.

What is claimed is:

1. A programmable microcontroller in a disk drive system for controlling an initiation of a plurality of processes during each sector period where said disk drive system performs a plurality of processes for controlling an operation of said disk drive system and includes rotational media with a rotational speed upon which is recorded a plurality of data tracks, where each data track is divided into sectors and each sector contains a recorded sector mark and a transducer for recovering data from said data tracks including sector marks, where the time between an occurrence of two adjacent sector marks is defined as a sector period, said programmable microcontroller comprising:

first means for detecting the occurrence of each said sector mark from the data read by said transducer;

second means connected to said first means for determining and storing from last two sector marks detected by said first means the sector period for a previous sector to a present sector for use as a predicted length for the present sector; and third means, in response to said sector mark detected by said first means for said present sector and said sector period for said previous sector determined and stored by said second means, for scheduling an initiation of each of said plurality of processes so as to maintain said initiation of each of said processes in a constant spatial relationship to said predict present sector period thereby minimizing an effect of variations in the rotational speed of said rotating media and synchronizing the initiation of said processes to said sector mark for the present sector, wherein said third means comprises:

a microprocessor for generating an initiation value for the initiation of each said processes during said present sector period as a function of said stored sector period for said previous sector; and a plurality of initiation means, each said initiation means associated with one of said processes for receiving said initiation value for said one of said processes from said microprocessor and for generating an initiation signal for said process after the occurrence of said sector mark as a function of a received initiation value.

2. The programmable microcontroller of claim 1 where said disk drive system further includes a DC spindle motor, said spindle motor's speed being responsive to a length of a spin commutation period during which power is applied to said spindle motor, said programmable microcontroller further including:

said processes defining tasks to be performed by said microprocessor, said tasks including a sector timing task and a rotational control task; and said plurality of initiation means associated with each of said tasks for generating and sending an interrupt signal for each of said associated tasks to said microprocessor to initiate processing of said associated task by said microprocessor.

3. The programmable microcontroller of claim 2 wherein;
said microprocessor processes said sector timing task to generate initiation values for all said processes including an initiation value for initiating a sector timing task for a next sector period where said initiation value will cause said associated initiation means to generate said sector timing task interrupt signal prior to the occurrence of said sector mark for said next sector.

4. The programmable microcontroller of claim 3 wherein:

said microprocessor processes said rotational control task to generate and store a spin commutation period value for correcting variations in the rotational speed of said DC spindle motor; and said sector timing task prior to the occurrence of the sector mark for said present sector applying said spin commutation period value generated and stored by said rotational control task last processed by said microprocessor for controlling the rotational speed of the rotational media and said spindle motor, for generating a sector period value for said previous sector upon the detection of said sector mark for said present sector and for determining and storing from said generated sector period said initiation values for said processes for said present sector.

5. The programmable microcontroller of claim 4 wherein said initiation means are programmable counters for storing said initiation values generated by said microprocessor.

6. A method for scheduling an initiation of a plurality of processes in a disk drive system, where said disk drive system processes a plurality of processes for controlling an operation of said disk drive system and disk drive system includes rotating media with a rotational speed upon which is recorded a plurality of data tracks, where each data track is divided into sectors and each sector contains a recorded sector mark and where the time between adjacent sector marks is defined as a sector period, a transducer for recovering data from said data tracks including sector marks and a programmable microcontroller for controlling the initiation of a plurality of processes during each sector period where said processes includes tasks to be processed by said microprocessor, said tasks including a sector timing task and a rotational control task, said method comprising the steps of:

a) sensing an occurrence of a sector mark by said transducer of a present sector;

b) determining the sector period for a previous sector to said present sector for used as a predicted present sector period for said present sector; and c) scheduling, during said present sector, in response to said sensed sector mark for said present sector and said predicted present sector period, an initiation of each of said plurality of processes so as to maintain the initiation of each of said processes in a constant spatial relationship to said predicted present sector period thereby minimizing an effect of variations in the rotational speed of said rotating media and synchronizing the initiation of said processes during said present sector period to said sector mark for said present sector;

wherein step c further comprises the steps of:

d) generating an initiation value for the initiation of each said processes as a function of said predicted present sector period; and e) generating an initiation signal from said initiation value for each said processes to initiate said processes after an occurrence of said sector mark in said present sector period; and wherein said step e further includes the steps of:

f) generating for each of said tasks to be scheduled during said present sector an interrupt signal from said initiation value for each of said tasks; and g) sending said interrupt signals to said microprocessor to initiate processing of said tasks by said microprocessor.

7. The scheduling method of claim 6, wherein said step d further includes the steps of:

h) processing said sector timing task for generating said initiation value for all said processes including an initiation value for initiating a sector timing task for a next sector period where said initiation value will cause the generation of said sector timing task interrupt signal to occur prior to the occurrence of said sector mark for a next sector.

8. The scheduling method of claim 7 wherein said disk drive system further includes a DC spindle motor for rotating said discs, said spindle motor speed being a function of a spin commutation period during which power is applied to said spindle motor, said scheduling method further comprises the steps of:

i) processing a rotational control task for generating and storing said spin commutation period value for correcting variations in the rotational speed of said spindle motor and said rotation media; and j) processing a sector timing task prior to the occurrence of said sector mark associated with said sector timing task being processed by said microprocessor for applying said spin commutation period value generated and stored by the rotational control task last processed by said microprocessor to control said rotational speed of said spindle motor.

\* \* \* \* \*